(12) United States Patent
Yelheri et al.

(10) Patent No.: US 12,019,524 B2
(45) Date of Patent: Jun. 25, 2024

(54) DATA CONNECTOR COMPONENT FOR IMPLEMENTING DATA REQUESTS

(71) Applicant: NetApp Inc., San Jose, CA (US)

(72) Inventors: Sharankumar Yelheri, Santa Clara, CA (US); Atul Ramesh Pandit, Los Gatos, CA (US); Tijin George, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/297,671

(22) Filed: Apr. 10, 2023

(65) Prior Publication Data

US 2023/0376387 A1 Nov. 23, 2023

Related U.S. Application Data

(63) Continuation of application No. 17/130,243, filed on Dec. 22, 2020, now Pat. No. 11,625,306.

(60) Provisional application No. 63/109,710, filed on Nov. 4, 2020.

(51) Int. Cl.
*G06F 12/00* (2006.01)
*G06F 11/14* (2006.01)
*G06F 16/11* (2019.01)

(52) U.S. Cl.
CPC ...... *G06F 11/1464* (2013.01); *G06F 11/1451* (2013.01); *G06F 11/1469* (2013.01); *G06F 11/1484* (2013.01); *G06F 16/128* (2019.01); *G06F 2201/84* (2013.01)

(58) Field of Classification Search
CPC ............. G06F 11/1464; G06F 11/1451; G06F 11/1469; G06F 16/128; G06F 2201/84
See application file for complete search history.

(56) References Cited

U.S. PATENT DOCUMENTS

| | | |
|---|---|---|
| 5,712,970 A | 1/1998 | Arnott et al. |
| 7,631,155 B1 | 12/2009 | Bono et al. |
| 8,285,758 B1 | 10/2012 | Bono et al. |
| 8,620,973 B1 | 12/2013 | Veeraswamy et al. |
| 9,767,106 B1 | 9/2017 | Duggal et al. |
| 9,817,834 B1 | 11/2017 | Searls et al. |
| 9,830,278 B1 | 11/2017 | Harwood et al. |

(Continued)

FOREIGN PATENT DOCUMENTS

| | | |
|---|---|---|
| EP | 1618504 A1 | 1/2006 |
| WO | 2015116125 A1 | 8/2015 |
| WO | 2019212768 A1 | 11/2019 |

OTHER PUBLICATIONS

Final Office Action dated Jun. 8, 2023 for U.S. Appl. No. 17/242,363, filed Apr. 28, 2021, 15 pages.

(Continued)

*Primary Examiner* — John A Lane
(74) *Attorney, Agent, or Firm* — Cooper Legal Group, LLC

(57) ABSTRACT

Techniques are provided for implementing data requests associated with objects of an object store. A data connector component may be instantiated as a container for processing data requests associated with backup data stored within objects of an object store. The data connector component may evaluate the object store to identify snapshots stored as the backup data within the objects of the object store according to an object format. The data connector component may provide a client device with access to backup data of the snapshots.

20 Claims, 16 Drawing Sheets

(56) References Cited

U.S. PATENT DOCUMENTS

| | | |
|---|---|---|
| 9,898,369 B1 | 2/2018 | Moghe et al. |
| 10,019,180 B1 | 7/2018 | Miah et al. |
| 10,089,187 B1 | 10/2018 | Pecoraro et al. |
| 10,114,581 B1 | 10/2018 | Natanzon et al. |
| 10,296,594 B1 | 5/2019 | Datta |
| 10,417,190 B1 | 9/2019 | Donlan et al. |
| 10,936,191 B1 | 3/2021 | Lakshminarayanan et al. |
| 11,016,943 B2 | 5/2021 | George et al. |
| 11,032,156 B1 | 6/2021 | Jain et al. |
| 11,080,253 B1 | 8/2021 | Leshinsky et al. |
| 11,086,105 B2 | 8/2021 | Chang et al. |
| 11,144,502 B2 | 10/2021 | George et al. |
| 11,144,503 B2 | 10/2021 | George et al. |
| 11,157,455 B2 | 10/2021 | Narasingarayanapeta et al. |
| 11,176,090 B2 | 11/2021 | Davis et al. |
| 11,182,096 B1 | 11/2021 | Tang et al. |
| 11,347,730 B1 | 5/2022 | Balakrishnan et al. |
| 11,392,541 B2 | 7/2022 | Bhattacharya et al. |
| 11,442,893 B2 | 9/2022 | Chen et al. |
| 11,531,648 B2 | 12/2022 | Smith et al. |
| 11,573,859 B2 | 2/2023 | Kumarasamy |
| 11,573,860 B1 | 2/2023 | Xiang et al. |
| 11,625,306 B2 | 4/2023 | Yelheri et al. |
| 2004/0260673 A1 | 12/2004 | Hitz et al. |
| 2006/0242489 A1 | 10/2006 | Brockway et al. |
| 2007/0100905 A1 | 5/2007 | Masters et al. |
| 2010/0033240 A1 | 2/2010 | Denison et al. |
| 2010/0179959 A1 | 7/2010 | Shoens |
| 2010/0185592 A1* | 7/2010 | Kryger ............... G06F 11/1448 707/769 |
| 2010/0332101 A1 | 12/2010 | Braunberger et al. |
| 2010/0332401 A1 | 12/2010 | Prahlad et al. |
| 2012/0143825 A1 | 6/2012 | Boehm et al. |
| 2012/0317079 A1 | 12/2012 | Shoens et al. |
| 2014/0040199 A1 | 2/2014 | Golab et al. |
| 2014/0040211 A1 | 2/2014 | Avery et al. |
| 2014/0094210 A1 | 4/2014 | Gellens et al. |
| 2014/0156601 A1 | 6/2014 | Strunk et al. |
| 2014/0181039 A1 | 6/2014 | Harrison et al. |
| 2014/0222878 A1 | 8/2014 | Avati et al. |
| 2015/0100791 A1 | 4/2015 | Chen et al. |
| 2016/0048431 A1 | 2/2016 | Modukuri et al. |
| 2016/0057229 A1 | 2/2016 | Barton et al. |
| 2016/0378563 A1 | 12/2016 | Gaurav et al. |
| 2017/0091235 A1 | 3/2017 | Yammine et al. |
| 2017/0123935 A1 | 5/2017 | Pandit et al. |
| 2017/0366606 A1 | 12/2017 | Ben-Shaul et al. |
| 2018/0018342 A1 | 1/2018 | Basrani |
| 2018/0113769 A1* | 4/2018 | Ahn ................... G06F 11/1469 |
| 2018/0137014 A1 | 5/2018 | Li et al. |
| 2018/0150548 A1 | 5/2018 | Shah et al. |
| 2018/0196827 A1 | 7/2018 | Sundaram et al. |
| 2018/0314835 A1 | 11/2018 | Dodson et al. |
| 2018/0356989 A1 | 12/2018 | Meister et al. |
| 2019/0065323 A1 | 2/2019 | Dhamdhere et al. |
| 2019/0220198 A1 | 7/2019 | Kashi Visvanathan et al. |
| 2019/0311049 A1 | 10/2019 | Bhargava M R et al. |
| 2019/0354617 A1 | 11/2019 | Kim |
| 2019/0361626 A1 | 11/2019 | East |
| 2019/0370610 A1 | 12/2019 | Batoukov et al. |
| 2020/0034241 A1* | 1/2020 | Vijayan ............... G06F 11/1458 |
| 2020/0065199 A1 | 2/2020 | Xing et al. |
| 2020/0065400 A1 | 2/2020 | Desai et al. |
| 2020/0241754 A1 | 7/2020 | Bett et al. |
| 2020/0242075 A1 | 7/2020 | Davis et al. |
| 2020/0285612 A1 | 9/2020 | George et al. |
| 2020/0285613 A1 | 9/2020 | George et al. |
| 2020/0285614 A1 | 9/2020 | George et al. |
| 2020/0285616 A1 | 9/2020 | George et al. |
| 2020/0301882 A1 | 9/2020 | Pogde et al. |
| 2021/0048995 A1 | 2/2021 | Myers et al. |
| 2021/0173814 A1* | 6/2021 | Liu ...................... G06F 16/182 |
| 2021/0240911 A1 | 8/2021 | Kucherov et al. |
| 2021/0342304 A1 | 11/2021 | Bangalore et al. |
| 2021/0382857 A1 | 12/2021 | Srivas et al. |
| 2021/0406129 A1 | 12/2021 | Zheng et al. |
| 2021/0406216 A1 | 12/2021 | Komatsu et al. |
| 2022/0027313 A1 | 1/2022 | George et al. |
| 2022/0138048 A1 | 5/2022 | Yelheri et al. |
| 2022/0138051 A1 | 5/2022 | Yelheri et al. |
| 2022/0138151 A1 | 5/2022 | Yelheri et al. |
| 2022/0138152 A1 | 5/2022 | Yelheri et al. |
| 2022/0138153 A1 | 5/2022 | Yelheri et al. |
| 2022/0138169 A1 | 5/2022 | Yelheri et al. |
| 2022/0138207 A1 | 5/2022 | Yelheri et al. |
| 2022/0382637 A1 | 12/2022 | Balasubramanian et al. |
| 2023/0029616 A1 | 2/2023 | Pandit et al. |
| 2023/0046216 A1 | 2/2023 | Daga et al. |
| 2023/0127847 A1* | 4/2023 | Kaul ................... G06F 16/196 711/162 |
| 2023/0333944 A1* | 10/2023 | Yadav ................ G06F 11/1453 |

OTHER PUBLICATIONS

Notice of Allowance dated Jun. 2, 2023 for U.S. Appl. No. 17/242,448, filed Apr. 28, 2021, 6 pages.
Non-Final Office Action dated Mar. 15, 2023 for U.S. Appl. No. 17/242,429, filed Apr. 28, 2021, 22 pages.
Non-Final Office Action dated May 11, 2023 for U.S. Appl. No. 17/242,399, filed Apr. 28, 2021, 39 pages.
Notice of Allowance dated May 1, 2023 for U.S. Appl. No. 17/242,356, filed Apr. 28, 2021, 8 pages.
Final Office Action dated Jul. 19, 2023 for U.S. Appl. No. 17/155,138, filed Jan. 22, 2021, 18 pages.
Notice of Allowance dated Jul. 13, 2023 for U.S. Appl. No. 17/242,356, filed Apr. 28, 2021, 04 pages.
International Preliminary Report on Patentability for Application No. PCT/US2021/057856 dated May 19, 2023, 15 pages.
International Preliminary Report on Patentability for Application No. PCT/US2021/057878, dated May 19, 2023, 11 pages.
Notice of Allowance dated May 17, 2023 for U.S. Appl. No. 17/242,356, filed Apr. 28, 2021, 4 pages.
Non-Final Office Action dated Oct. 12, 2023 for U.S. Appl. No. 17/155,138, filed Jan. 22, 2021, 18 pages.
Extended European Search Report for Application No. EP21206537, dated Apr. 4, 2022, 8 pages.
Extended European Search Report for Application No. EP21206538, dated Apr. 19, 2022, 7 pages.
International Search Report and Written Opinion for Application No. PCT/US2021/057856 dated Apr. 26, 2022, 20 pages.
International Search Report and Written Opinion for Application No. PCT/US2021/057878 dated Feb. 24, 2022, 14 pages.
Liu, et al., "Stateful Container Online Migration Method and Apparatus," 2015.
Metula E., et al., "Advanced Topics," Destructors, 2022, 11 pages, Reprinted from the Internet at: https://www.sciencedirect.com/topics/computer-science/destructors.
Michael V., et al., "Cumulus," ACM Transactions on Storage, Association for Computing Machinery, New York, 2009, vol. 5(4), pp. 1-28.
Non-Final Office Action for U.S. Appl. No. 17/242,399 dated Jul. 21, 2022, 30 pages.
Non-Final Office Action for U.S. Appl. No. 17/242,448 dated Jul. 13, 2022, 25 pages.
Notice of Allowance dated Apr. 3, 2023 for U.S. Appl. No. 17/242,356, filed Apr. 28, 2021, 11 pages.
Non-Final Office Action dated Sep. 27, 2023 for U.S. Appl. No. 17/242,363, filed Apr. 28, 2021, 19 pages.
Final Office Action dated Sep. 9, 2022 for U.S. Appl. No. 17/130,243, filed Dec. 22, 2020, 13 pages.
Non-Final Office Action dated Jun. 1, 2022 for U.S. Appl. No. 17/130,243, filed Dec. 22, 2020, 08 pages.
Non-Final Office Action dated Nov. 23, 2022 for U.S. Appl. No. 17/155,138, filed Jan. 22, 2021, 26 pages.
Notice of Allowance dated Aug. 9, 2023 for U.S. Appl. No. 17/242,356, filed Apr. 28, 2021, 04 pages.
Notice of Allowance dated Dec. 12, 2022 for U.S. Appl. No. 17/130,243, filed Dec. 22, 2020, 05 pages.

(56) References Cited

OTHER PUBLICATIONS

Final Office Action dated Oct. 31, 2023 for U.S. Appl. No. 17/242,399, filed Apr. 28, 2021, 28 pages.
Notice of Allowance dated Dec. 22, 2023 for U.S. Appl. No. 17/242,448, filed Apr. 28, 2021, 3 pages.
Notice of Allowance dated Oct. 24, 2023 for U.S. Appl. No. 17/242,448, filed Apr. 28, 2021, 3 pages.
Notice of Allowance dated Feb. 2, 2024 for U.S. Appl. No. 17/242,399, filed Apr. 28, 2021, 09 pages.
Notice of Allowance mailed on Feb. 14, 2024 for U.S. Appl. No. 17/242,399, filed Apr. 28, 2021, 05 pages.
Notice of Allowance mailed on Mar. 13, 2024 for U.S. Appl. No. 17/242,363, filed Apr. 28, 2021, 08 pages.
Final Office Action mailed Apr. 23, 2024 for U.S. Appl. No. 17/155,138, filed Jan. 22, 2021, 20 pages.

* cited by examiner

DATA CONNECTOR COMPONENT FOR IMPLEMENTING DATA REQUESTS

RELATED APPLICATIONS

This application claims priority to U.S. Patent Application, titled "DATA CONNECTOR COMPONENT FOR IMPLEMENTING DATA REQUESTS", filed on Dec. 22, 2020 and accorded application Ser. No. 17/130,243, which claims priority to U.S. Provisional Patent Application, titled "DATA CONNECTOR COMPONENT FOR IMPLEMENTING DATA REQUESTS", filed on Nov. 4, 2020 and accorded Application No. 63/109,710, which are incorporated herein by reference.

BACKGROUND

Many users utilize cloud computing environments to store data, host applications, run virtual machines, etc. A client device may connect to a cloud computing environment in order to transmit data from the client device to the cloud computing environment for storage. The client device may also retrieve data from the cloud computing environment. In this way, the cloud computing environment can provide scalable low cost storage.

Some users and businesses may use or deploy their own primary storage systems such as a clustered network of nodes (storage controllers) for storing data, hosting applications, etc. A primary storage system may provide robust data storage and management features, such as data replication, data deduplication, encryption, backup and restore functionality, snapshot creation and management functionality, incremental snapshot creation, etc. However, storage provided by such primary storage systems can be relatively more costly and less scalable compared to cloud computing storage. Thus, cost savings and scalability can be achieved by using a hybrid of primary storage systems and remote cloud computing storage. Unfortunately, the robust functionality provided by primary storage systems is not compatible with cloud computing storage, and thus these features are lost.

DETAILED DESCRIPTION

Figure 1:
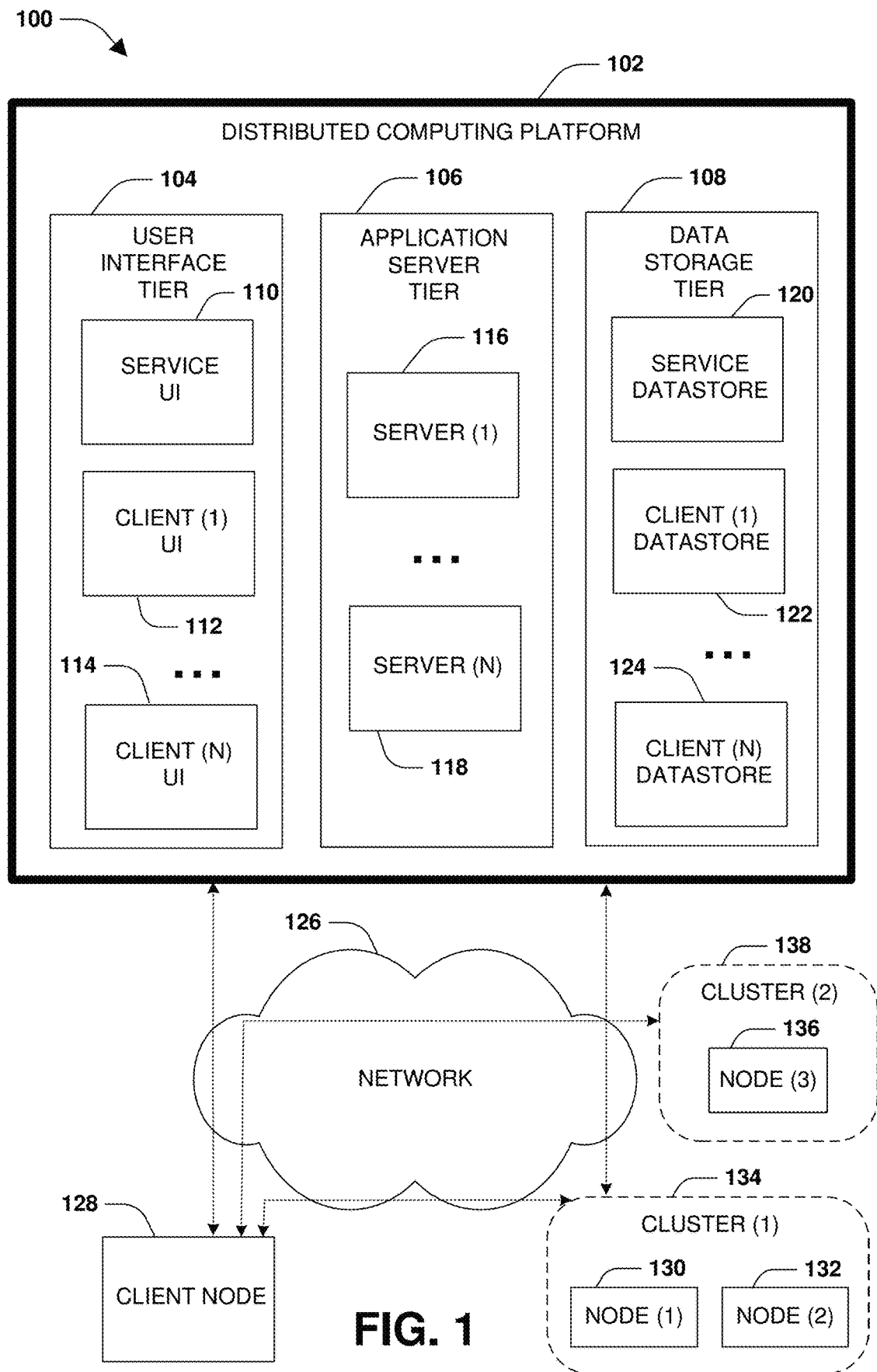
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

An object file system is used to store, retrieve, and manage objects within an object store, such as a cloud computing environment. The object file system is capable of representing data in the object store in a structured format. It may be appreciated that any type of data (e.g., a file, a directory, an image, a storage virtual machine, a logical unit number (LUN), application data, backup data, metadata, database data, a virtual machine disk, a snapshot, etc.) residing in any type of computing device (e.g., a computer, a laptop, a wearable device, a tablet, a storage controller, a node, an on-premise server, a virtual machine, another object store or cloud computing environment, a hybrid storage environment, data already stored within the object store, etc.) using any type of file system can be stored into objects for storage within the object store. This allows the data to be represented as a file system so that the data of the objects can be accessed and mounted on-demand by remote computing devices. This also provides a high degree of flexibility in being able to access data from the object store, a cloud service, and/or a network file system for analytics or data access on an on-demand basis. The object file system is able to represent snapshots in the object store, and provides the ability to access snapshot data universally for whomever has access to an object format of the object file system. Snapshots in the object store are self-representing, and the object file system provides access to a complete snapshot copy without having to access other snapshots.

The object file system provides the ability to store any number of snapshots in the object store so that certain types of data such as cold data (e.g., infrequently accessed data) can be stored for long periods of time in a cost effective manner, such as in the cloud. The object file system stores data within relatively larger objects to reduce cost. Representation of data in the object store is complete, such that all data and required container properties can be independently recovered from the object store. The object file system format ensures that access is consistent and is not affected by eventual consistent nature of underlying cloud infrastructure.

The object file system provides version neutrality. Changes to on-prem metadata versions provide little impact on the representation of data in the object store. This allow data to be stored from multiple versions of on-prem over time, and the ability to access data in the object store without much version management. The object file system provides an object format that is conducive to garbage collection for freeing objects (e.g., free slots and/or objects storing data of a delete snapshot), such as where a lower granularity of data can be garbage collected such as at a per snapshot deletion level.

In an embodiment, snapshots of data, such as of a primary volume, maintained by a computing device (e.g., a node, storage controller, or other on-prem device that is remote to the object store) can be created by the computing device. The snapshots can be stored, such as by a data mover, in the object store independent of the primary volume and can be retained for any duration of time. Data can be restored from the snapshots without dependency on the primary volume. The snapshot copies in the object store can be used for load distribution, development testing, virus scans, analytics, etc. Because the snapshot copies (e.g., snapshot data stored within objects) are independent of the primary volume at the computing device, such operations can be performed without impacting performance of the computing device.

A snapshot is frozen in time representation of a file system. All the necessary information may be organized as files. All the blocks of the file system may be stitched together using cloud block numbers (e.g., a cloud block number comprises a sequence number of an object and a slot number of a slot within that object) and the file will be represented by a data structure (e.g., represented in a tree format of a tree structure) when stored into the object store within one or more objects. Using cloud block numbers, a next node within the tree structure can be identified for traversing the tree structure to locate a node representing data to be accessed. The block of the data may be packed into bigger objects to be cloud storage efficient, where blocks are stored into slots of a bigger object that is then stored within the object store. All the indirections (pointers) to reach leaf nodes of a file (e.g., user data such as file data is represented by leaf nodes within the tree structure) may be normalized and may be version independent. Every snapshot may be a completely independent copy and any data for a snapshot can be located by walking the object file system. While doing incremental snapshot copy, changed blocks between two snapshots may be copied to the object store, and unchanged blocks will be shared with previous snapshots as opposed to being redundantly stored in the object store. In this way, deduplication is provided for and between snapshot data stored within objects of the object store. As will be described later, an embodiment of a snapshot file system in the object store is illustrated by FIG. 5B.

Cloud block numbers are used to uniquely represent data (e.g., a block's worth of information from the computing device) in the object store at any point in time. A cloud block number is used to derive an object name (e.g., a sequence number) and an index (a particular slot) within the object. An object format, used by the object file system to format objects, allows for sharing of cloud blocks. This provides for storage space efficiency across snapshots so that deduplication and compression used by the computing device will be preserved. Additional compression is applied before writing objects to the object store and information to decompress the data is kept in the object header.

Similar to data (e.g., a file, directory, or other data stored by the computing device), metadata can be stored into objects. Metadata is normalized so that the restoration of data using the metadata from an object to a remote computing device will be version independent. That is, snapshot data at the computing device can be stored into objects in a version neutral manner. Snapshots can be mounted and traversed independent of one another, and thus data within an object is represented as a file system, such as according to the tree structure. The format of non-leaf nodes of the tree structure (e.g., indirects such as pointers to other non-leaf nodes or to leaf nodes of user data) can change over time. In this way, physical data is converted into a version independent format as part of normalization. Denormalization may be performed while retrieving data from the objects, such as to restore a snapshot. In an example of normalization, a slot header in an object has a flag that can be set to indicate that a slot comprises normalized content. Each slot of the object is independently represented. Slot data may comprise version data. The slot data may specify a number of entries within the object and an entry size so that starting offsets of a next entry can be calculated from the entry size of a current entry.

In an embodiment, denormalization of a first version of data/metadata (e.g., a prior version) can be retrieved from data backed up in an object according to a second version (e.g., a future version). In an example, if the future version added a new field, then during denormalization, the new field is skipped over. Denormalization of a future version can be retrieved from data backed up in an object according to a prior version. A version indicator in the slot data can be used to determine how of an entry is to be read and interpreted, and any missing fields will be set to default values.

In an embodiment of the object format of objects stored within the object store by the data mover, relatively larger objects will be stored in the object store. As will be described later, an embodiment of an object is illustrated by FIG. 5C. An object comprises an object header followed by data blocks (slots). The object header has a static array of slot context comprising information used to access data for slots. Each slot can represent any length of logical data (e.g., a slot is a base unit of data of the object file system of the object store). Since data blocks for metadata are normalized, a slot can represent any length of logical data. Data within the slots can be compressed into compression groups, and a slot will comprise enough information for how to decompress and return data of the slot.

In an embodiment, storage efficiency provided by the computing device is preserved within the object store. A volume copied from the computing device into objects of the object store is maintained in the object store as an independent logical representation of the volume. Any granularity of data can be represented, such as a directory, a qtree, a file, or other data container. A mapping metafile (a VMAP) is used to map virtual block IDs/names (e.g., a virtual volume block number, a hash, a compression group name, or any other set of names of a collection of data used by the computing device) to cloud block numbers in the object store. This mapping metafile can be used to track duplicate data per data container for storage efficiency.

The mapping metafile enables duplicate data detection of duplicate data, such as a duplicate block or a compression group (e.g., a compressed group of blocks/slots within an object). The mapping metafile is used to preserve sharing of data within and across multiple snapshots stored within objects in the object store. The mapping metafile is used for sharing of groups of data represented by a unique name. The mapping metafile is used to populate indirect blocks with corresponding cloud block numbers for children nodes (e.g., compressed or non-compressed). The mapping metafile is used to help a garbage collector make decisions on what cloud block numbers can be freed from the object store when a corresponding snapshot is deleted by the computing device. The mapping metafile is updated during a snapshot copy operation to store snapshot data from the computing device into objects within the object store. An overflow mapping metafile can also be used, such as to represent entries with base key collision. The overflow mapping metafile will support variable length key and payload in order to optimize a key size according to a type of entry in the overflow mapping metafile.

The mapping metafile may be indexed by virtual volume block numbers or starting virtual volume block numbers of a compression group. An entry within the mapping metafile may comprise a virtual volume block number as a key, a cloud block number, an indication of whether the cloud block number is the start of a compression group, a compression indicator, an indicator as to whether additional information is stored in the overflow mapping metafile, a logical length of the compression group, a physical length of the compression group, etc. Entries are removed/invalidated from the mapping metafile if corresponding virtual volume block numbers are freed by the computing device, such as when a snapshot is deleted by the computing device.

The data structure, such as the tree structure, is used to represent data within an object. Each node of the tree structure is represented by a cloud block number. The key to the tree structure may uniquely identify uncompressed virtual volume block numbers, a contiguous or non-contiguous compression group represented by virtual volume block numbers associated with such, and/or an entry for non-starting virtual volume block numbers of the compression group to a starting virtual volume block number of the compression group. A key will comprise a virtual volume block number, a physical length of a compression group, an indicator as to whether the entry represents a start of the compression group, and/or a variable length array of virtual volume block numbers of either non-starting virtual volume block numbers or the starting virtual volume block number (if uncompressed then this is field is not used). The payload will comprise cloud block numbers and/or flags corresponding to entries within the mapping metafile.

Before transferring objects to the object store for an incremental snapshot, the mapping metafile is processed to clear any stale entries. This is to ensure that a stale virtual volume block number or compression group name is not reused for sharing (deduplication). In particular, between two snapshots, all virtual volume block numbers transitioning from a 1 to 0 (to indicate that the virtual volume block numbers are no longer used) in a snapshot to be copied to the object store in one or more objects are identified. Entries within the mapping metafile for these virtual volume block numbers transitioning from a 1 to 0 are removed from the mapping metafile. In this way, all entries using these virtual volume block numbers are invalidated.

As part of copying a snapshot to the object store, changed data and indirections for accessing the changed data are transferred (or all data for initialization). In particular, changed user data of the computing device is traversed through buftrees using a snapdiff operation to determine a data difference between two snapshots. Logical (uncompressed) data is read and populated into objects and associated with cloud block numbers. To preserve storage efficiency, a mapping from a unique name representing the logical data (e.g., virtual volume block number or a compression group name for compressed data) to a cloud block number (e.g., of a slot within which the logical data is stored) is recorded in the mapping metafile. Lookups to the mapping metafile will be performed to ensure only a single copy of changed blocks are copied to the object store. Metadata is normalized for version independency and stored into objects. Indirects (non-leaf nodes) are stored in the object to refer to unchanged old cloud blocks and changed new cloud blocks are stored in the object, which provides a complete view of user data and metadata for each snapshot. Inodes are written to the object store while pushing changed inofile blocks to the object store. Each inode entry within an inofile is normalized to represent a version independent inode format. Each inode will have a list of next level of indirect blocks (e.g., non-leaf nodes of the tree structure storing indirects/pointers to other nodes). Snapinfo objects comprise snapshot specific information. A snapinfo object of a snapshot has a pointer to a root of a snapshot logical file system. A root object for each primary volume (e.g., a primary volume for which a snapshot is captured) is copied to the object store. Each snapshot is associated with an object ID (sequence number) map that tracks which objects are in use in a snapshot (e.g., which objects comprise data of the snapshot) and is subsequently used for garbage collection in the future when a particular snapshot is deleted.

In an embodiment of data access and restoration, the tree format represents an object file system (a cloud file system) that can be mounted and/or traversed from any remote device utilizing APIs using a thin layer orchestrating between client requests and object file system traversal. A remote device provides an entry point to the object tree using a universal identifier (UUID) that is a common identifier for all object names for a volume (or container). A rel root object is derived from the UUID, which has pointers (names) to next level snapinfo objects. If a user is browsing a snapshot, a snapshot snapinfo is looked up within snapinfo objects. If no snapshot is provided, then latest snapshot info is used. The snapshot info has cloud block numbers for an inode file. The inode file is read from the object store using the cloud block number and an inode within the inode file is read by traversing the inode file's tree structure. Each level including the inode has a cloud block number for a next level until a leaf node (a level 0 block of data) is read. Thus, the inode for the file of interest is obtained, and the file's tree structure is traversed by looking up cloud block number for a next level of the tree structure (e.g., a cloud block number from a level 1 is used to access the level 0 block) until the required data is read. Object headers and higher level indirects are cached to reduce the amount of access to the object store. Additionally, more data may be read from the object store than needed to benefit from locality for caching. Data access can be used to restore a complete copy of a snapshot, part of a snapshot (e.g., a single file or directory), or metadata.

In an embodiment of read/write cloning, a volume or file, backed from a snapshot in the object store, is created. Read access will use a data access path through a tree structure. At a high level, write access will read the required data from the object store (e.g., user data and all levels of the file/volume tree that are part of user data modification by a write operation). The blocks are modified and the modified content is rewritten to the object store.

In an embodiment, defragmentation is provided for objects comprising snapshot copies in the object store and to prevent fragmented objects from being sent to the object store during backup. Defragmentation of objects involves rewriting an object with only used data, which may exclude unused/freed data no longer used by the computing device (e.g., data of a deleted snapshot no longer referenced by other snapshots). An object can only be overwritten if used data is not changed. Object sequence numbers are not reused. Only unused data can be freed, but used data cannot be overwritten. Reads will ensure that slot header and data are read from same object (timestamp checking). Reading data from the object store involves reading the header info and then reading the actual data. If these two reads go to different objects (as determined by timestamp comparison), then the read operation is failed and retried.

Defragmentation occurs when snapshots are deleted and objects could not be freed because another snapshot still contains some reference to the objects that would be freed (not all slots within these objects are freed but some still comprise used data from other snapshots). A slot within an object can only be freed when all snapshots referring to that slot are deleted (e.g., an oldest snapshot having the object in use such that younger snapshots do not reuse the freed slots). Also, ownership count can be persistently stored. When a snapshot is deleted, all objects uniquely owned by that snapshot are freed, but objects present in other snapshots (e.g., a next/subsequent snapshot) are not freed. A count of such objects is stored with a next snapshot so that the next snapshot becomes the owner of those objects. Defragmentation is only performed when a number of used slots in an object (an object refcount) is less than a threshold. If the number is below a second threshold, then further defragmentation is not performed. In order to identify used slots and free slots, the file system in the snapshot is traversed and a bitmap is constructed where a bit will be used to denote if a cloud block is in use (a cloud block in-use bitmap). This map is used to calculate the object refcount.

To perform defragmentation, the cloud block in-use map is prepared by walking the cloud snapshot file system. This bitmap is walked to generate an object refcount for the object. The object refcount is checked to see if it is within a range to be defragmented. The object is checked to see if the object is owned by the snapshot by comparing an object ID map of a current and a previous snapshot. If the object is owned and is to be defragmented, then the cloud block in-use map is used to find free slots and to rewrite the object to comprise data from used slots and to exclude freed slots. The object header will be updated accordingly with new offsets.

Fragmentation may be mitigated. During backup, an object ID map is created to contain a bit for each object in use by the snapshot (e.g., objects storing snapshot data of the snapshot). The mapping metafile (VMAP) is walked to create the object ID map. An object reference map can be created to store a count of a number of cloud blocks in use in that object. If the count is below a threshold, then data of the used blocks can be rewritten in a new object.

For each primary volume copied to the object store, there is a root object having a name starting with a prefix followed by a destination end point name and UUID. The root object is written during a conclude phase. Another copy for the root object is maintained with a unique name as a defense to eventual consistency, and will have a generation number appended to the name. A relationship state metafile will be updated before the root object info is updated. The root object has a header, root info, and bookkeeping information.

A snapshot info is an object containing snapshot specific information, and is written during a conclude phase of a backup operation. Each object will have its own unique sequence number, which is generated automatically.

As provided herein, one or more data connector components are implemented for processing data requests associated with objects within an object store (e.g., a cloud computing environment). In an embodiment of providing replication services such as for hybrid cloud (e.g., services spanning across a hybrid of an object store/cloud computing environment and an on-premise computing environment of nodes), copies of primary volume data are created in the object store. For example, copies of data within a primary volume hosted by a storage operating system of a node are copied as snapshots that are stored as backup data within objects. The objects are stored within storage structures such as buckets within an object store accordingly to an object format. A data mover may be configured to move the backup data from the primary volume to the object store. In this way, data from a volume may be transformed into an object format (e.g., a snapshot file system format tailored for the object store) and transported to the object store. That is, the data mover is configured to move data from a storage operating system of a node (e.g., an on-premise node) into an object store as objects formatted according to the object format. The data mover transforms data in volumes into the object format for storage within objects in the object store. Utilizing of the object store as a replication target to store backup data of snapshots is thus performed in order to reduce storage costs because backup data can be efficiently stored in the object store. The ability to backup snapshot data of a volume to the object store allows for forever incremental backups.

Looking up a file or file version(s) in multiple snapshots stored as backup data within slots of objects, such as for performing a single file restore of a single file, may involve the use of file metadata information. This may involve the creation of an inventory of files and/or metadata for the backup data of multiple snapshots for merely restoring a single file. Thus, the ability to read backup data on-demand such as a single file is difficult if not impossible. Metadata inventory management via a catalog could be performed, but it would consume a significant amount of space and compute resources in a large database. It would be cost and compute expensive to manage the database, thus mitigating any cost benefits from using the object store to store backup data.

Accordingly, as provided herein, a data connector component (ADC) is implemented as a scale-out container that provides for live or on-demand browsing of backup data of a volume and all snapshots of the volume stored within objects in the object store. The data connector component can re-use file and metadata that is already part of backup data within the object store, and can be deployed on-demand merely for a time duration during which a client will utilize the data connector component, such as for browsing backed up files. Thus, the data connector component provides a very cost effective alternative to catalog databases. This can be achieved because the object format used by objects to store backup data of snapshots is a snapshot file system, which can be evaluated to identify backup data to read on-demand. Any number of data connector components can be instantiated as containers in a scale out manner to allow for distributed access to all snapshots of a volume. The containers can be either used independently or can be embedded in other software and/or deployed as a cluster for high throughput and availability.

The data connector component may be packaged as a container and may utilize file system in user space (FUSE) to provide a portable operating system interface (POSIX) style read only access to a user layer for backup data that is copied using mirroring functionality to the object store, in an embodiment. It may be appreciated that data access may be provided through other means than POSIX style read only access, such as REST APIs or other methods of exposing data for access. The FUSE layer helps in redirecting low-level kernel operations to corresponding custom-defined operations of the data connector component. The custom-defined operations of the data connector component provide on-demand access, along with providing customer file system modules such as a buffer cache, a threading model, etc. Also, the data connector component can be deployed in a scale-out manner, which can be managed independent or as a cluster for divide and conquer scale requirements.

In an embodiment of the data connector component implementing data requests, live/on-demand browsing is provided through a browsable user interface through which a client can browse files, directories, and/or other backup data of snapshots stored as backup data within objects of the object store according to the object format (e.g., the snapshot file system). The ability to on-demand browse backup data of snapshots allow clients to visually browse and locate files and/or versions of files, such as to restore the files without using expensive database-based catalogs that are expensive to operate. The data connector component provides container-based browse and find capabilities. Since the data connector component may be stateless and on-demand, the cost of implementing the data connector component is minimum. Also, the data connector component can facilitate single file restores of files, which requires access to certain attributes of files that can be retrieved on-demand by the data connector component using live browsing capabilities without having to maintain such attributes within an expensive catalog database.

In an embodiment of the data connector component implementing data requests, the data connector component provides the ability to read file data. In particular, the data connector component may expose a namespace to users at various granularities, such as at a storage structure granularity (e.g., a granularity of a bucket within which one or more objects may be stored such that a single namespace for all volumes backed up into the bucket may be provided). The namespace allows for browsing of all files and directories, and reading file data for all snapshots copied as backup data into objects within the object store. There is no limit on the rate the data can be read from a storage structure (bucket) because multiple data connector components can be instantiated and scaled out using any number of containers for reading in parallel.

In an embodiment, data can be accessed and recovered via the data connector component. The data connection component may be different software than a storage operating system of a node that maintains volumes from which the snapshots were created for backing up data of the volumes to the object store. This satisfies certain client constraints of having to have access to data such as backup data via two different software applications (e.g., access to data through the storage operating system and through the data connector component), such as part of a service level agreement (SLA). In an embodiment, data can be accessed and used for compliance enforcement. Any use cases or services that can operate on a copy of data and require scale out access to data can be satisfied using data connector components. In an embodiment, the data connector component can be used to provide a list of files that were modified since a previous snapshot. This feature reduces the time and duplicate effort for scan-based services, which can avoid rescanning files in newer snapshots that were scanned earlier in a previous snapshot and need not be scanned again.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other file system metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain file system operations needed to deduplicate a block, duplicate records in the dup file are sorted in certain file system sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an decompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
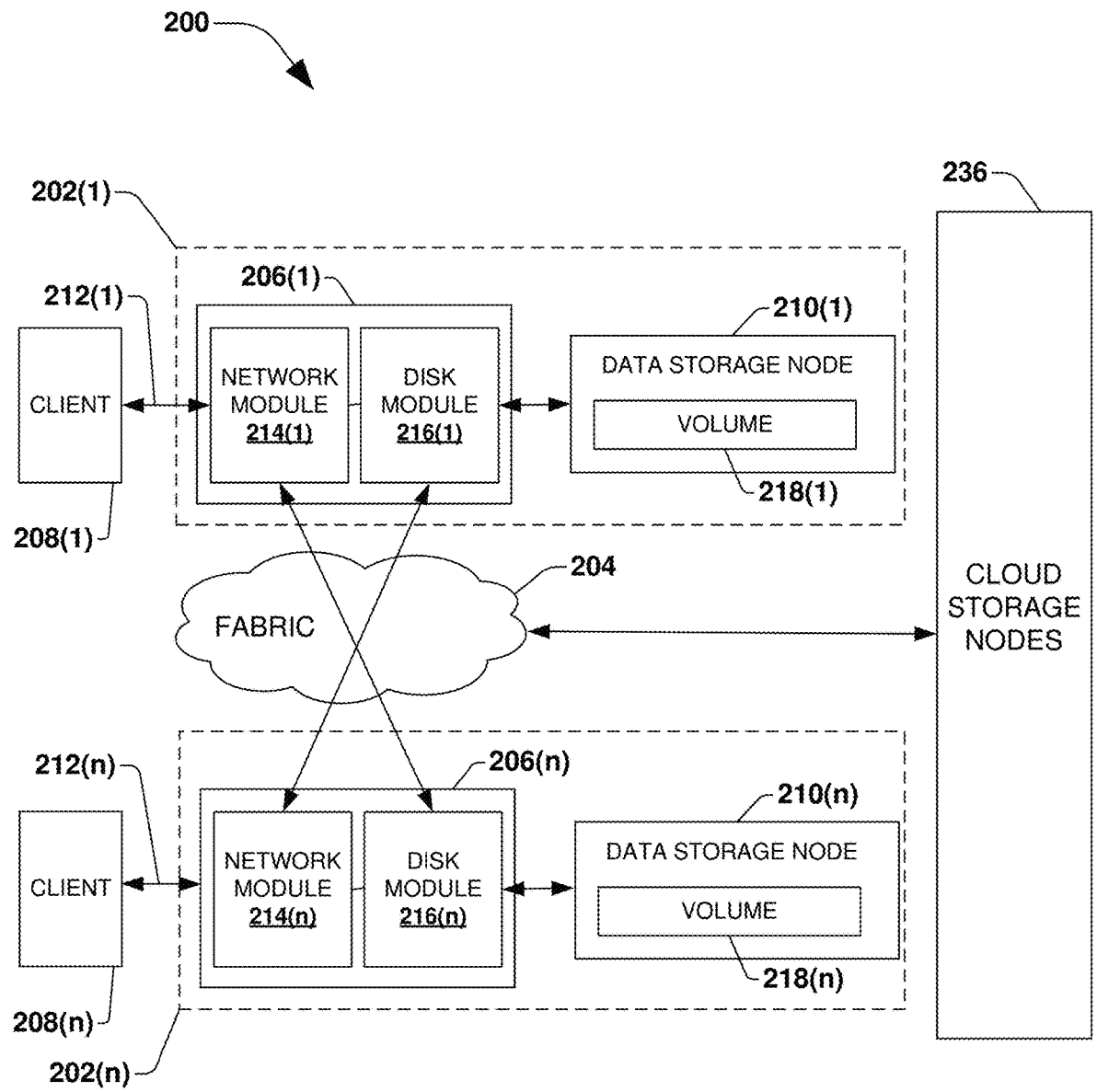
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more file systems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
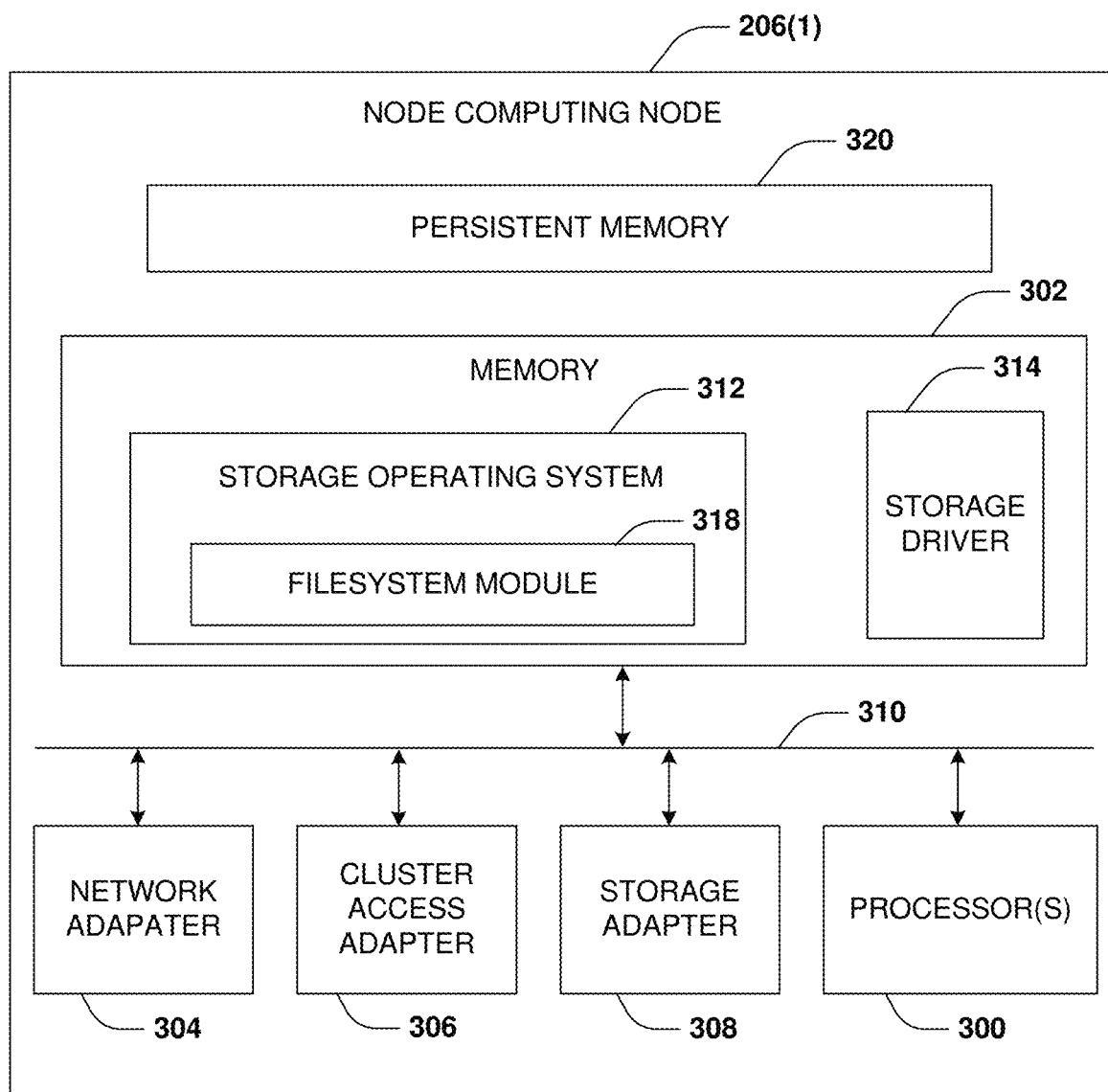
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more file systems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a file system.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

In the example, the node computing device 206(1) comprises persistent memory 320. The persistent memory 320 comprises a plurality of pages within which data can be stored. The plurality of pages may be indexed by page block numbers.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
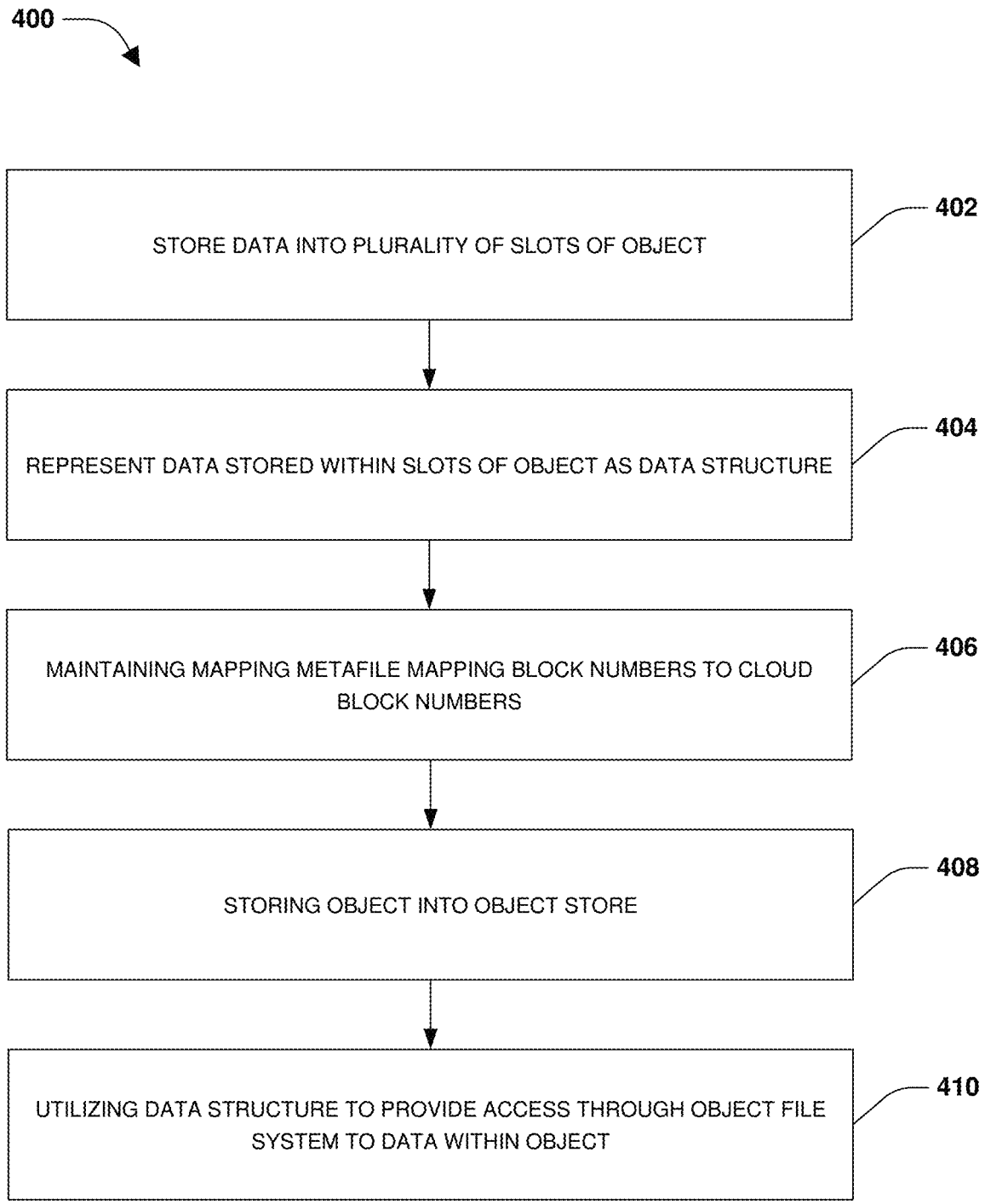
FIG. 4 is a flow chart illustrating an example method for managing objects within an object store using an object file system.
Figure 5A:
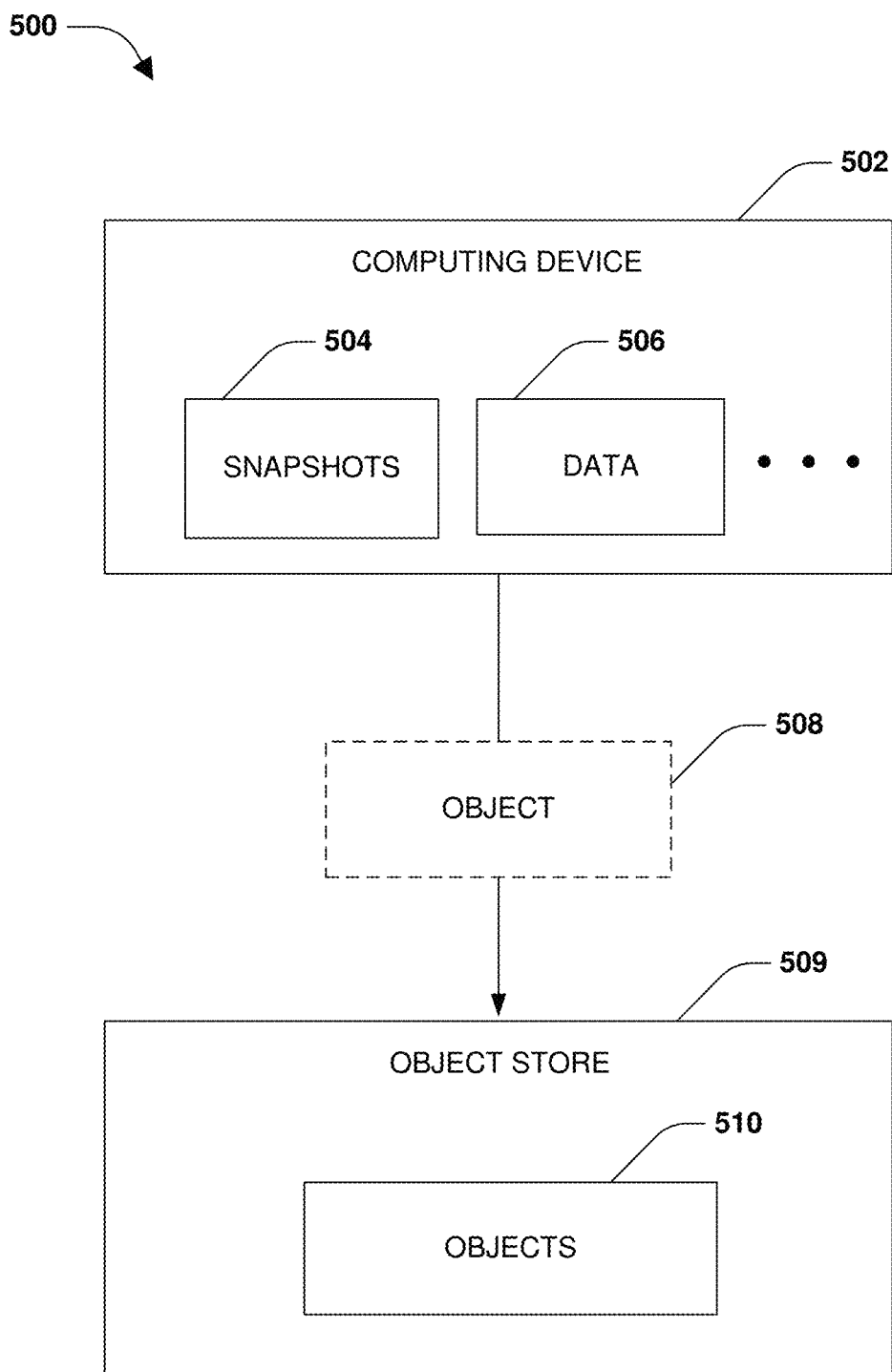
FIG. 5A is a component block diagram illustrating an example system for managing objects within an object store using an object file system.
Figure 5B:
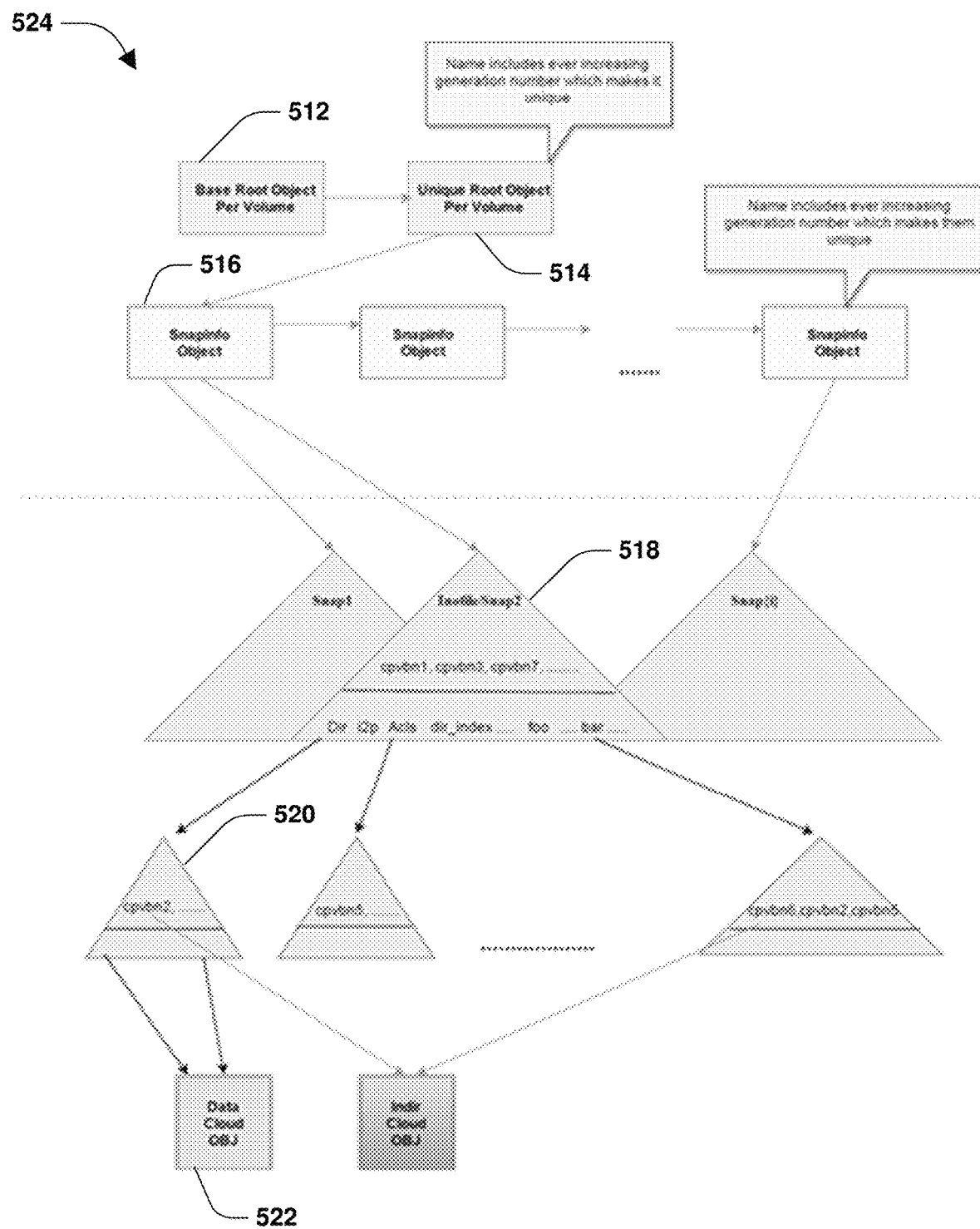
FIG. 5B is an example of a snapshot file system within an object store.
Figure 5C:
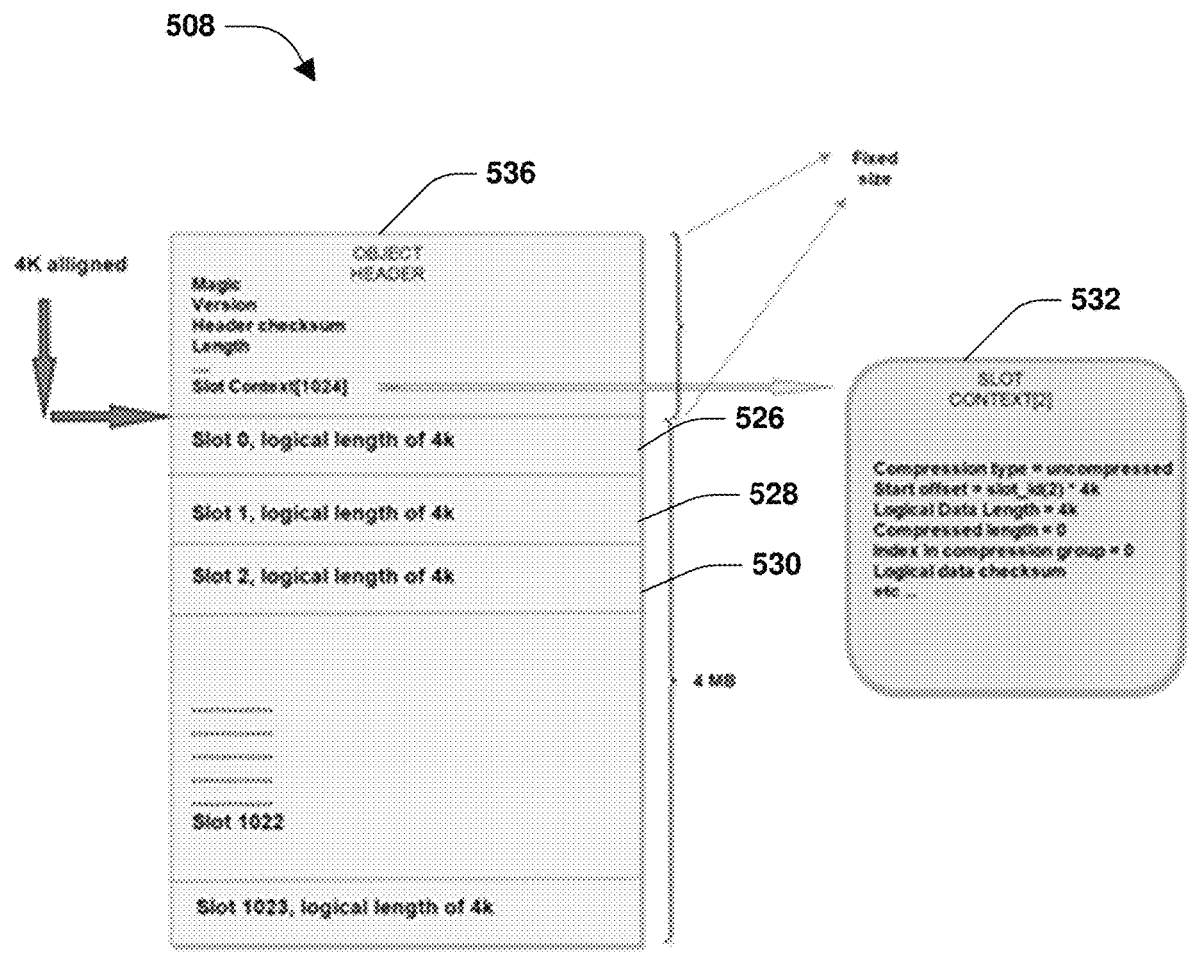
FIG. 5C is an example of an object stored within an object store.

One embodiment of managing objects within an object store using an object file system is illustrated by an exemplary method 400 of FIG. 4 and further described in conjunction with system 500 of FIG. 5A. It may be appreciated that a data mover and/or one or more data connector components may be configured to implement the techniques described with respect to FIGS. 4 and 5A-5C (e.g., create objects within an object store according to an object format, and implement requests such as management requests, data requests, and/or integrity verification upon objects, snapshots, and/or backup data within the object store).

A computing device 502 may comprise a node, a storage controller, a storage service, an on-premises computing device, a storage virtual machine, or any other hardware or software. The computing device 502 may store data 506 within storage devices (primary storage) managed by the computing device 502. The computing device 502 may provide client devices with access to the data 506, such as by processing read and write operations from the client devices. The computing device 502 may create snapshots 504 of the data 506, such as a snapshot of a file system of a volume accessible to the client devices through the computing device 502. The computing device 502 may be configured to communicate with an object store 509 over a network. The object store 509 may comprise a cloud computing environment remote to the computing device 502.

As provided herein, an object file system and object format is provided for storing and accessing data, such as snapshots, stored within objects in the object store 509. At 402, the data 506, maintained by the computing device, is stored into a plurality of slots of an object 508. Each slot represents a base unit of data of the object file system defined for the object store 509. For example, the object 508 comprises 1024 or any other number of slots, wherein each slot comprises 5 kb of data or any other amount of data. It may be appreciated that objects may comprise any number of slots of any size. User data, directory blocks, metadata, and/or inofile blocks of an inofile comprising per inode metadata is stored into the slots of the object 508. In an example, snapshot data, of a snapshot created by the computing device 502 of a file system maintained by the computing device 502, is stored into the object 508. For example, the object 508 may be maintained as an independent logical representation of the snapshot, such that data of the snapshot is accessible through the object 508 without having to reference other logical copies of other snapshots stored within objects 510 of the object store 509. In an example, the data is converted from physical data into a version independent format for storage within the object 508.

In an example, the object 508 is created to comprise data in a compressed state corresponding to compression of the data within the primary storage of the computing device 502. In this way, compression used by the computing device 502 to store the data is retained within the object 508 for storage within the object store 509. The object 508 may be assigned a unique sequence number. Each object within the object store 509 is assigned unique sequence numbers.

An object header may be created for the object 508. The object header comprises a slot context for slots within the object 508. The slot context may comprise information relating to a type of compression used for compressing data within the object 508 (if any compression is used), a start offset of a slot, a logical data length, a compressed data length, etc. The slot context may be used to access compressed data stored within the object 508.

FIG. 5C illustrates an example of the object 508. The object 508 comprises an object header 536 and a plurality of slots, such as a slot 526, a second 528, a slot 530, and/or any other number of slots. The object header 536 may have a size that is aligned with a start of the plurality of slots, such as having a 5 kb alignment based upon each slot having a logical length of 5 kb. It may be appreciated that slots may have any length. The object header 536 comprises various information, such as a version identifier, a header checksum, a length of the object 508, a slot context 532, and/or other information used to access and manage data populated into the slots of the object 508.

The slot context 532 comprises various information about the slots, such as a compression type of a slot (e.g., a type of compression used to compress data of slots into a compression group or an indicator that the slot does not comprise compressed data), a start offset of the slot within the object 508 (e.g., a slot identifier multiplied by a slot size, such as 5 kb), a logical data length of the slot (e.g., 5 kb), a compressed length (e.g., 0 if uncompressed), an index of the slot within a compression group of multiple slots (e.g., 0 if uncompressed), a logical data checksum, etc.

At 404, the data stored within the slots of the object 508 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 508 and/or a slot number of a slot comprising a portion of the data represented by the node. User data, directory blocks, metadata, inofile blocks of an inofile, and/or other data stored within the slots of the object 508 may be represented by nodes within the data structure. In an example, user data is stored within leaf nodes of the data structure (e.g., nodes within a level 0 (L0) level of the tree structure). Pointers (indirects) may be stored within non-leaf nodes of the data structure (e.g., nodes within a level 1(L1), a level 2 (L2), and/or other levels of the tree structure). An inode object for the file may comprise pointers that point to non-leaf nodes within a top level of the data structure.

In an example of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 5B illustrates a snapshot file system of data structures 524 (e.g., a structure that can be traversed by a data connector component) used to represent snapshots (e.g., snapshots of one or more volumes managed by the computing device 502) stored into the objects 510 of the object store 509. There is one base root object per volume, such as a base root object 512 for a volume of which the snapshots were captured. There is a unique root object per volume, such as a unique root object 514 for the volume. The base root object 512 may point to the unique root object 514. Names of the unique root objects may be derived from increasing generation numbers. The unique root object 514 may point to snapinfo objects, such as a snapinfo object 516 comprising information regarding one or more snapshots, such as a pointer to an inofile 518 of a second snapshot of the volume. The inofile 518 comprises cloud block numbers of slots within an object comprising data of the second snapshot, such as a pointer to an indirect 520 that points to data 522 of the snapshot. The inofile 518 may comprise or point to information relating to directories, access control lists, and/or other information.

At 406, a mapping metafile (a VMAP) is maintained for the object 508. The mapping metafile maps block numbers of primary storage of the computing device 502 (e.g., virtual volume block numbers of the data stored into slots of the object 508) to cloud block numbers of nodes representing portions of the data stored within the slots of the object 508. At 408, the object 508 is stored within the object store 509. In an example of storing objects into the object store 509, the plurality of snapshots 504, maintained by the computing device 502, are stored within objects 510 of the object store 509. Each snapshot is identifiable through a snapinfo object that has a unique generation number. As will be described later, the objects 510 within the object store 509 may be deduplicated with respect to one another (e.g., the object 508 is deduplicated with respect to the object 510 using the mapping metafile as part of being stored into the object store 509) and retain compression used by the computing device 502 for storing the snapshots 504 within the primary storage.

At 410, the mapping metafile and/or the data structure are used to provide access through the object file system to portions of data within the slots of the object 508 in the object store 509. In an example, the inode object and the data structure are traversed to identify a sequence number and slot number of requested data. The sequence number and the slot number are used to access the requested data within a corresponding slot of the object 508. In an example, a read request targets a 100,000$^{th}$ level 0 block stored within the object 508. The inode object is read to calculate which blocks in each level of the data structure will have 100,000 (e.g., 100,000/255 is a 493th block in level 1 and 493/255 is a $2^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 508 and a slot number. The sequence number corresponds to an object name of the object 508 and the slot number is which slot the data is located within the object 508.

In an embodiment, an on-demand restore of data within a snapshot stored within objects of the object store 509 can be performed to a target computing device using the mapping metafile and/or the data structure. In an embodiment, the mapping metafile and/or the data structure may be used to free objects from the object store 509 based upon the objects comprising snapshot data of snapshots deleted by the computing device 502.

In an embodiment, the mapping metafile and/or an overflow mapping metafile are used to facilitate the copying of the snapshots to the object store 509 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 504 maintained by the computing device 502 and copied into the objects 510 of the object store 509 as copied snapshots. An entry within the mapping metafile is populated with a mapping between a block number of data within a snapshot at the computing device 502 (e.g., a virtual volume block number) and a cloud block number (e.g., a cloud physical volume block number) of a slot within an object into which the data was copied when the snapshot was copied to the object store 509 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 502 within the primary storage, which are copied to the object store as copied snapshots). In an example, the block numbers may correspond to virtual volume block numbers of data of the snapshots stored by the computing device 502 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 502.

The mapping metafile and/or the overflow mapping metafile is used to determine what data of the current snapshot is to be copied to the object store 509 and what data already exists within the object store 509 so that only data not already within the object store 509 is transmitted to the object store 509 for storage within an object. Upon determining that the current snapshot is to be copied to the object store 509, an invalidation phase is performed. In particular, a list of deallocated block numbers of primary storage of the computing device 502 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 509 and a prior copied snapshot already copied from the primary storage to the object store 509 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 509.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 509 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 509. Once the object is stored within the object store 509, the mapping metafile and/or the overflow mapping metafile is updated with entries for the deduplicated set of changed block numbers based upon receiving an acknowledgment of the object being stored by the object store 509. An entry will map a changed block number to a cloud block number of a slot within which data of the changed block number is stored in the object.

In an embodiment, the object file system is used to provide various primary storage system services for the object store 509 in order to achieve efficient space and resource management, and flexible scaling in the object store 509 (e.g., a cloud computing environment). Additionally, pseudo read only snapshots are provided through the object store 509. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 502). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 509, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 502, to the object store 509 such as cloud services within the cloud storage environment.

In one embodiment, objects within the object store 509 (e.g., objects within a cloud computing environment) can be maintained with a read only attribute such that data within objects can be overwritten/modified/freed so long as in-use data within the objects is not altered. In particular, an object may be maintained within the object store 509, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 502 is storing data of a snapshot of a local file system within a slot of an object, and thus the snapshot data is in-use until a particular event occurs such as the computing device 502 deleting the snapshot). In an example, the object comprises snapshot data of a file system, a volume, a logical unit number (LUN), a file, or any other data of the computing device 502. In this way, the object comprises a read only snapshot of data of the computing device 502. In one example, a plurality of objects corresponding to read only snapshots of the file system of the computing device 502 are stored within the object store 509. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 502 (a primary storage system). For example, an in-use slot may be a slot that comprises snapshot data (e.g., secondary/replicated data) of a snapshot created by a computing device 502. The slot becomes an unused slot when the data is no longer actively referenced, used, and/or maintained, such as where the computing device 502 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the computing device 502 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 502. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 509. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 502. The snapshot may be determined as being deleted by the computing device 502, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 502 (primary storage system) otherwise used to execute the garbage collection operation. The garbage collection operation free objects from the object store 509 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 509 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 509. However, if the object is not unique to only deleted snapshot(s) such as where the object also stores data of an active/undeleted snapshot, then the object is not freed.

In an embodiment, defragmentation is provided for fragmented objects within the object store 509. In an example, defragmentation is implemented by a cloud service or application executing in the object store 509 in order to conserve resources otherwise used by a computing device 502 (primary storage system) that would execute defragmentation functionality. An object within the object store 509 is determined to be a fragmented object based upon the object comprising at least one freed slot from which data was freed. For example, a freed slot may comprise an unused slot comprising unused data no longer referenced/used by the computing device 502 (e.g., data of a deleted snapshot). Accordingly, the fragmented object may comprise one or more in-use slots of in-use data currently referenced/used by a computing device 502 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 509.

The present system preserves deduplication and compression used by the computing device 502 for snapshots when storing copied snapshots to the object store 509 notwithstanding copied snapshots representing fully logical copies of data in the primary storage of the computing device 502. In particular, deduplication is preserved because data that is shared in a snapshot (e.g., a local or primary snapshot created and maintain by the node) is also shared in a copied snapshot in the object store 509. Deduplication of compression groups is maintained while logically representing the compression groups in a copied snapshot. Block sharing across multiple snapshots is also preserved so that merely changed blocks are transferred/copied to the object store 590 during incremental snapshot transfers.

The present system provides additional compression on a snapshot data copy. In particular, larger compression groups provide more space efficiency but with less read efficiency compared to smaller compression groups. Relatively smaller compression groups may be used by the computing device 502 of the storage system since access to the primary storage of the computing device 502 may be more read intensive, and thus read efficiency is prioritized over storage space efficiency. Because copied snapshots in the object store 509 are infrequently accessed (e.g., cold data that is infrequently read), relatively larger compression groups can be employed for improved storage space efficiency within the object store, which also reduces network bandwidth for snapshot copying to the object store 509.

In one embodiment, snapshots maintained by the computing device 502 are copied to the object store 509 as copied snapshots representing logical data of the snapshots. Data of the copied snapshots is stored into slots of objects that are deduplicated with respect to other objects stored within the object store 509 and retain compression used by the computing device 502 for the snapshots.

In an example, the computing device 502 stores data within primary storage. The computing device 502 may create snapshots of the data stored by the computing device 502. For example, the computing device 502 may create a snapshot of a file, a logical unit number, a directory, a volume, a storage virtual machine hosting a plurality of volumes, a file system, a consistency group of any arbitrary grouping of files, directories, or data, etc. The computing device 502 may deduplicate data between the snapshots so that instead of storing redundant data blocks multiple times, merely references are stored in place of the redundant data blocks and point to original data blocks with the same data. The computing device 502 may compress data within the snapshots, such as by creating compression groups of compressed data blocks.

The mapping metafile and/or the overflow mapping metafile is used to determine what data of the current snapshot is to be copied to the object store 509 and what data already exists within the object store so that only data not already within the object store is transmitted to the object store 509 for storage within an object. Upon determining that the current snapshot is to be copied to the object store, an invalidation phase is performed. In particular, a list of deallocated block numbers of primary storage of the computing device 502 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

It may be appreciated that a data mover and/or one or more data connector components may be configured to implement the techniques described with respect to FIGS. 4 and 5A-5C (e.g., create objects within an object store according to the object format, and implement requests such as management requests, data requests, and/or integrity verification upon objects, snapshots, and/or backup data within the object store).

Figure 6:
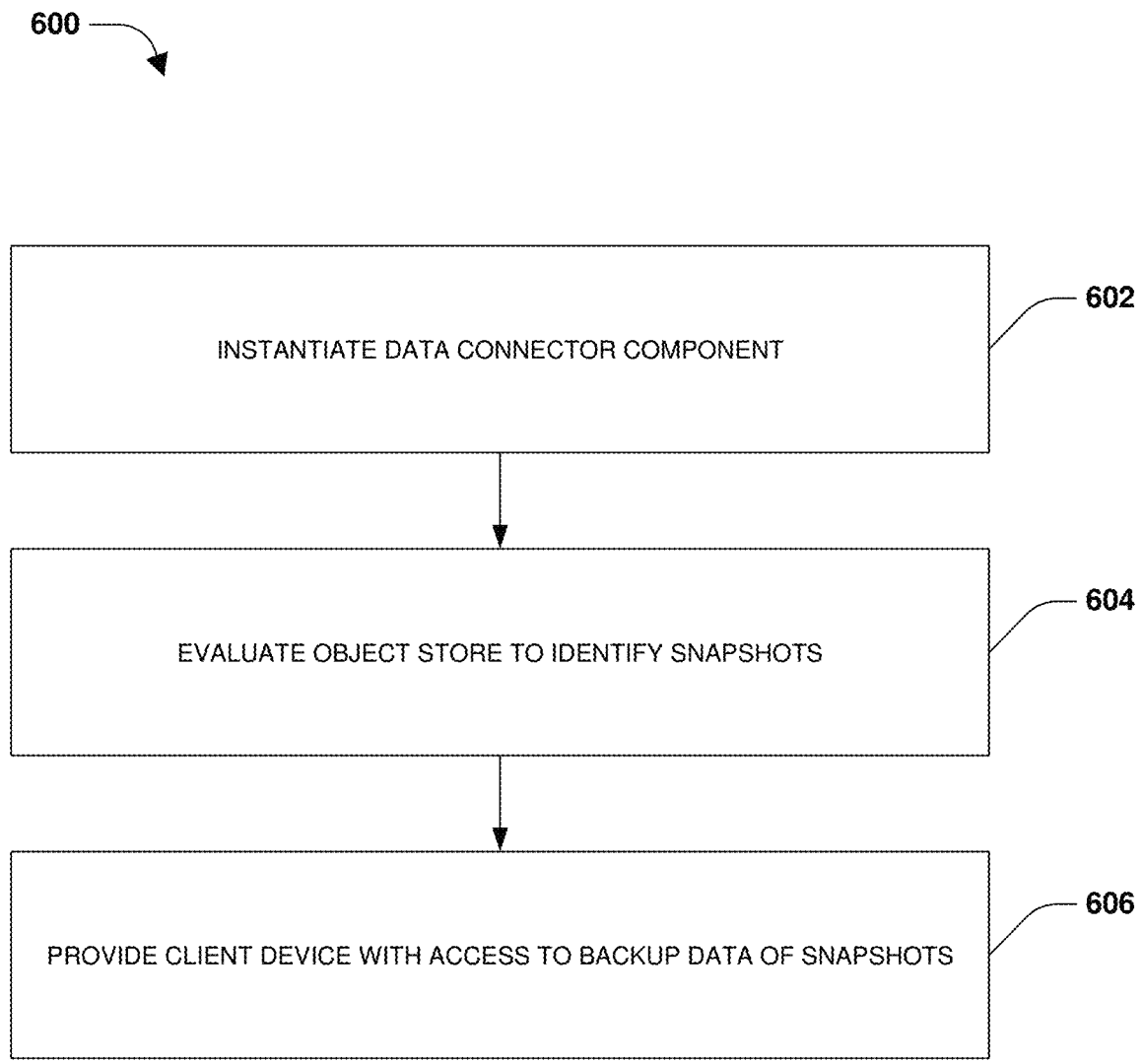
FIG. 6 is a flow chart illustrating an example method for implementing data requests associated with objects stored within an object store.
Figure 7:
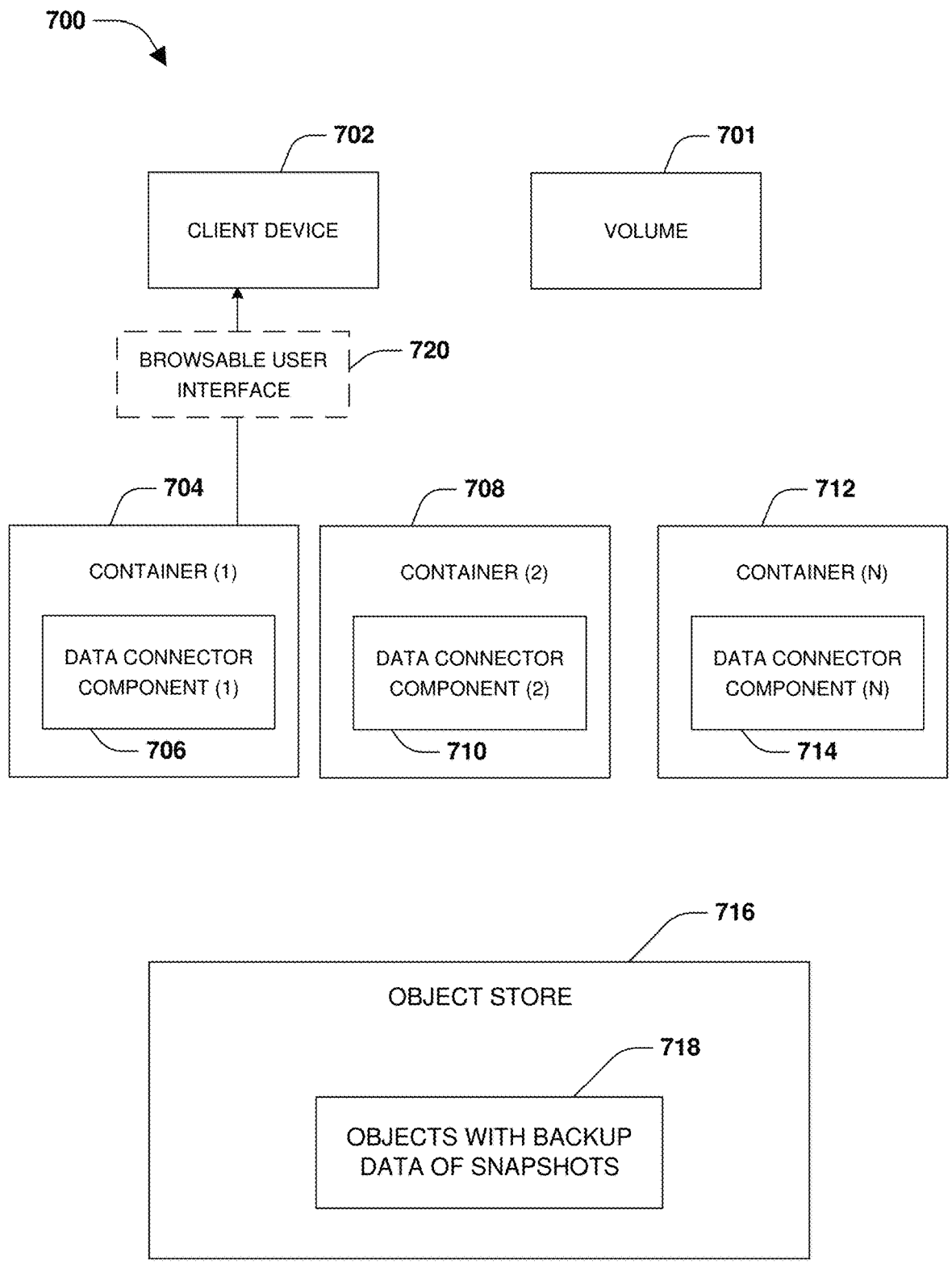
FIG. 7 is a component block diagram illustrating an example system for implementing data requests associated with objects stored within an object store.

One embodiment of implementing data requests for an object store is illustrated by an exemplary method 600 of FIG. 6 and further described in conjunction with system 700 of FIG. 7. A client device 702 may store data within a volume, such as a volume 701 hosted and managed by a storage operating system of a node. A data mover may utilize the techniques described in relation to FIGS. 4 and 5A-5C to create snapshots of the volume 701, store backup data of the snapshots within objects 718 that are then stored within an object store 716, such as a cloud computing environment. Each snapshot may be self-representing and is associated with a snapshot file system tree (a tree structure) that can be traversed to identify, locate, and/or access files, directories, and/or metadata of a snapshot stored within one or more objects. Because snapshots may be incremental, data within an object may be shared by one or more snapshots or may be unique to a particular snapshot. An object (e.g., object 508 of FIG. 5C) may have a particular object format within which backup data of snapshots may be stored within slots of the object. A data connector component may be configured to understand the object format and/or traverse the snapshot file system tree (the tree structure) so that the data connector component can provide data access to objects 718, and snapshots and/or backup data of the snapshots within the objects 718 stored within the object store 716 according to the object format, which was described in relation to FIGS. 4 and 5A-5C.

Data connector components may be instantiated through containers on an as need basis, and thus can be instantiated when a data request is to be processed (e.g., instantiated on-demand in response to a client requesting the ability to browse and read backed up files), and may be deconstructed once the data request(s) is finished, which can reduce the cost and/or compute of hosting the data connector components. Any number of data connector components may be instantiated so that multiple data connector components may provide parallel data access to objects, backup data, and/or snapshots. For example, a first data connector component 706 may be instantiated as a first container 704, a second data connector component 710 may be instantiated as a second container 708, and an nth data connector component 714 may be instantiated as an nth container 712. A data connector component may be stateless, such that requests received and processed by the data connector component will comprise information used to facilitate the request (e.g., credentials to access an object, a target storage structure such as a bucket within which the object is stored in the object store 716, etc.).

In an embodiment, a request associated with a snapshot or backup data stored within the object store 716 as an object within a storage structure (e.g., a bucket) according to the object format may be received. In response to the request, a data connector component may be instantiated as a container, such as where the first data connector component 706 is instantiated as the first container 704. In an embodiment, a plurality of data connector components may be instantiated as containers for implementing management requests direct to the object store 716 in parallel. Instances of containers of data connector components may be added or removed to scale up or down based upon demand. The data connector component may be instantiated as the container as a stateless image, such that management requests will comprise state information corresponding to an identifier of a snapshot, an identifier of a storage structure storing an object comprising backup data of the snapshot (e.g., a bucket comprising the object), and/or credentials to access the object.

The request may be implemented upon the objects 718 within the object store 716 according to the object format interpretable by the data connector component. For example, the data connector component may be capable of reading an object header of an object, reading backup data from slots within the object, traversing a structure (e.g., data structures 524 of FIG. 5B) such as a snapshot file system tree (a tree structure) of a snapshot to locate files, directories, and/or metadata of the snapshot, as describe in conjunction with FIGS. 4 and 5A-5C. In particular, a structure (e.g., data structures 524 of FIG. 5B, such as a snapshot file system tree) associated with an object/snapshot (e.g., object 508 of FIG. 5C) may be traversed to identify the snapshot, such as backup data of the snapshot upon which the management request is to be executed. For example, if a particular file of the snapshot is to be accessed, then the structure may be traversed to locate the file, which may be stored as backup data within one or more slots within one or more objects within the object store 716. In this way, the data connector component may be capable of interpreting the object format and/or traversing the structure (e.g., a snapshot file system tree) to identify files, directories, and/or metadata of snapshots backed up as backup data on-demand. In this way, the data connector component can provide clients with on-demand access to backup data within the object store 716.

During operation 602 of method 600 of FIG. 6, a data connector component, such as the first data connector component 706, may be instantiated as a container, such as the first container 704, for processing data requests associate with backup data stored within the objects 718 of the object store 716. In an embodiment, the data connector component may be instantiated as a container on-demand in response to a request, such as from the client device 702, to access backed up data of snapshots stored within the objects 718 of the object store 716. Furthermore, the data connector component and container may be deconstructed on-demand, such as in response to an indication that data access to the backup data is completed (e.g., the client device 702 is finished browsing the snapshots and backup data within the objects 718). In an embodiment, the data connector component may be instantiated as the container as being stateless. Thus, a data request may comprise state information used to implement the data request, such as credentials to access backup data within the object store 716, an identifier of a storage structure (bucket) within which the objects 718 are stored, etc. Accordingly, any data connector component may service the data request and/or resume servicing the data request in the event of a failure because the data request (or a retry of the data request) will comprise the state information used to resume servicing the data request.

In an embodiment, a plurality of data connector components, such as the first data connector component 706, the second data connector component 710, and/or other data connector components may be instantiated as containers for providing parallel access to read data from snapshots whose backup data is stored within the objects 718 of the object store 716. A plurality of handler threads may be implemented to process data requests using the plurality of data connect components in parallel.

In an embodiment, a storage operating system of a node may provide the client device 702 with access to the snapshots stored as the backup data within the objects 718 of the object store 716, along with the data connector component providing access to the snapshots stored as the backup data within the objects 718 of the object store 716. Because the storage operating system and the data connector component are implemented as separate software components, the client device 702 may be provided with multiple access pathways to the backup data, such as where the storage operating system is a first access software component for accessing the backup data and the data connector component is a second access software component for accessing the backup data that is independent of the first access software component. This may provide the client device 702 with the ability to comply with various compliance requirements and/or service level agreements that may specify that multiple independent access paths are to be provided to backup data.

During operation 604 of method 600 of FIG. 6, the data connector component evaluates the object store 716 to identify snapshots stored as the backup data within the objects 718 of the object store 716 according to the object format and having the snapshot file system tree (e.g., a tree structure). In an embodiment, the data connector component may implemented the techniques discussed in relation to FIGS. 4 and 5A-5C for interpreting the object format and/or traversing a snapshot file system tree (the tree structure) of a snapshot to identify files, directories, and/or metadata stored as backup data within slots of the objects 718 in the object store 716. That is, the data connector component is configured to interpret an object according the object format of the object to identify the backup data of snapshots, such as file, directories, and/or metadata. In particular, the data connector component may receive a request from a file system in user space module (FUSE) for data access to backup data. The data connector component may implement a custom operation to walk a tree structure associated with an object (e.g., a snapshot filesystem tree of a snapshot) within which backup data of the snapshot is stored in order to access data targeted by the request. In an embodiment, the request may be implemented as a file restore operation to restore a file within a snapshot to a restoration destination, such as the volume 701.

During operation 606 of method 600 of FIG. 6, the data connector component may provide the client device 702 with access to backup data of the snapshots. In an embodiment, the backup data may be mounted in a use space associated with a virtual file system that routes requested received through the mounted backup data of a file system in user space module (FUSE) that redirects the requests to the data connector component. In this way, the data connector component implements a custom operation to walk a tree structure associated with an object (e.g., a snapshot file system tree of a snapshot whose data is stored within an object) to access data targeted by the request.

In an embodiment, the data connector component may provide the client device 702 with an on-demand (live) browsable user interface based upon data and/or metadata extracted from snapshots according to the object format such as by traversing a tree structure of the snapshot (e.g., a snapshot file system tree). The on-demand browsable user interface may be populated with files and/or directories within snapshots. In this way, a user of the client device 702 may visually navigate through snapshot file system trees of files and/or directories of snapshots in order to locate files and/or particular versions of files, such as for restoring such files back to the volume 701. In an embodiment, the data connector component may expose a namespace to the client device 702 for browsing files and/or directories of snapshots according to various granularities, such as a snapshot level granularity of files and directories of a snapshot, a structure (bucket) granularity of snapshots whose backup data is stored within objects of a bucket, a multi-structure granularity, etc.

In an embodiment, a scanner may be implemented to scan files of a snapshot, such as for compliance purposes. Because of the incremental nature of snapshots, many files of a snapshot may be shared with other snapshots. If the scan was performed upon a first snapshot at a first point in time and is now to scan a second snapshot at a second point in time, then the data connector component may identify a list of files within the second snapshot that were modified since the first snapshot. The scanner may be implemented to scan merely the list of files that were modified, and may skip the other files that are shared between the first snapshot and the second snapshot (e.g., unmodified files) because those files were already scanned.

In an embodiment, the data connector component may implement a cache in order to cache certain data and/or metadata so that such data and/or metadata does not have to be re-retrieved from the object store 716, which can otherwise be time consuming and expensive. In an example, the cache may be populated with object metadata and inode information mapping file names of files within snapshots to inodes. In an embodiment, the data connector component may perform read ahead caching to store additional data and/or metadata predicted to be subsequently accessed. For example, in response to the data connector component receiving a read request to read data form a snapshot within the object store 716, the data connector component may perform a read ahead to cache additional data and/or metadata of the snapshot into the cache (e.g., if the read request is to a first 4 kb block of data, then a next 4 kb block of data may also be retrieved).

In an embodiment, a storage operating system of a node hosting the volume 701 and/or a virtual machine for the client device 702 may become unavailable and cannot provide the client device 720 with access to the virtual machine. The virtual machine may have been backed up to the object store 716 as a snapshot. Accordingly, the snapshot may be utilized within the object store 716 to launch a new instance of the virtual machine for access by the client device 702.

Figure 8:
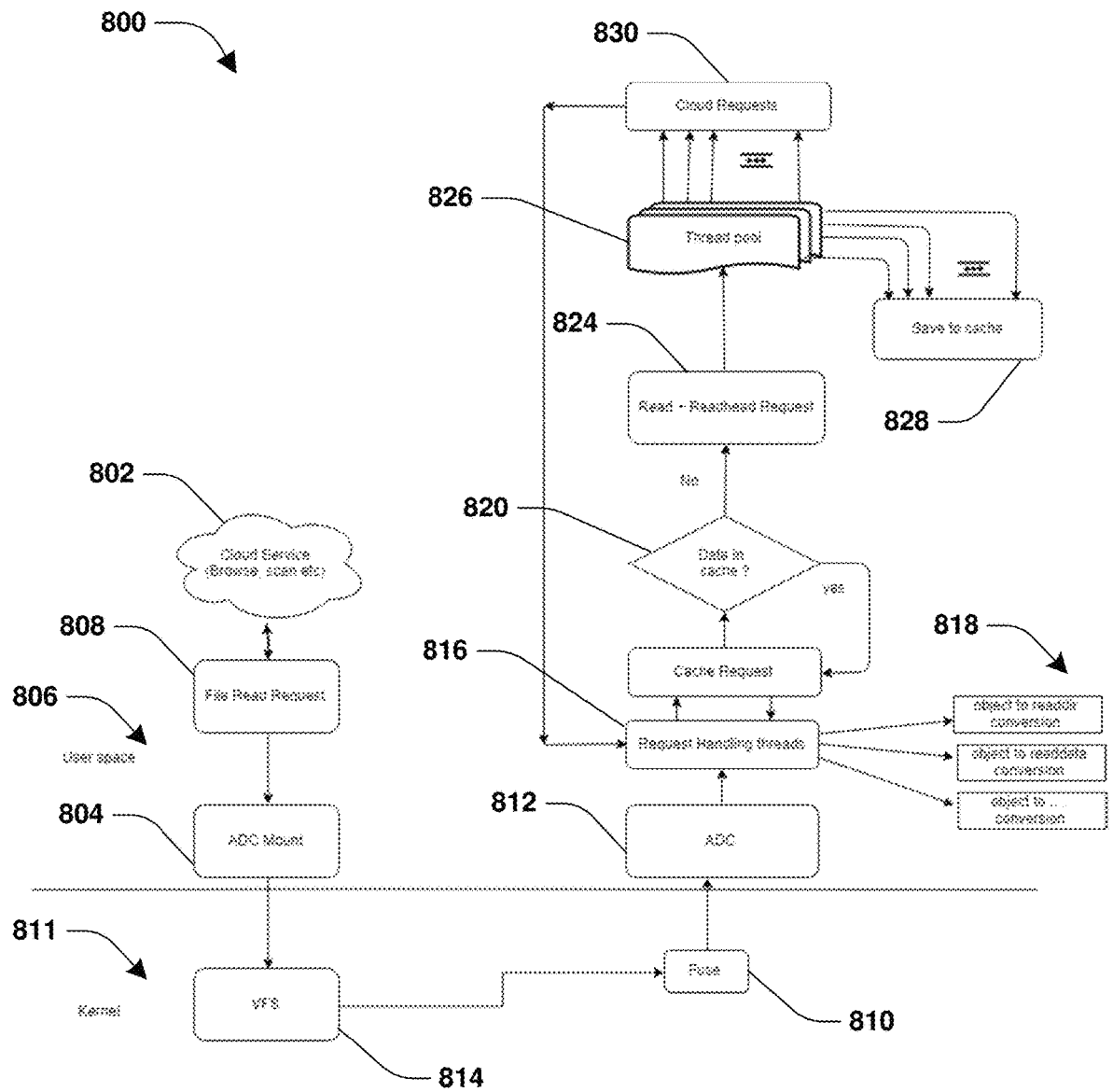
FIG. 8 is a component block diagram illustrating an example system for implementing data requests associated with objects stored within an object store.

FIG. 8 illustrates a data connector component 812 (ADC) processing requests. The data connector component 812 may mount 804 backup data stored within a data store within a user space 806 for access through a cloud service 802 (e.g., a service allowing client devices to on-demand browse backup data, perform scans such as compliance scans, etc.) to perform data requests 808, such as file read requests, of backup data. The data connector component 812 may receive the data requests 808 through a FUSE component 810 to which the data requests 808 are redirected by a virtual file system 814 within a kernel layer 811. A request handling thread 816 may process a data request, which may utilizing custom operations/functionality to perform an object to read directory/data conversion 818. If the requested data is within a cache 820, then the data is read from the cache. Otherwise, a read and/or read ahead 824 is performed using a thread from a tread pool 826. The data, read from the object store using cloud requests 830 by the read and/or read ahead 824, may be cached 828 in order to provide such data back to a requestor.

Figure 9:
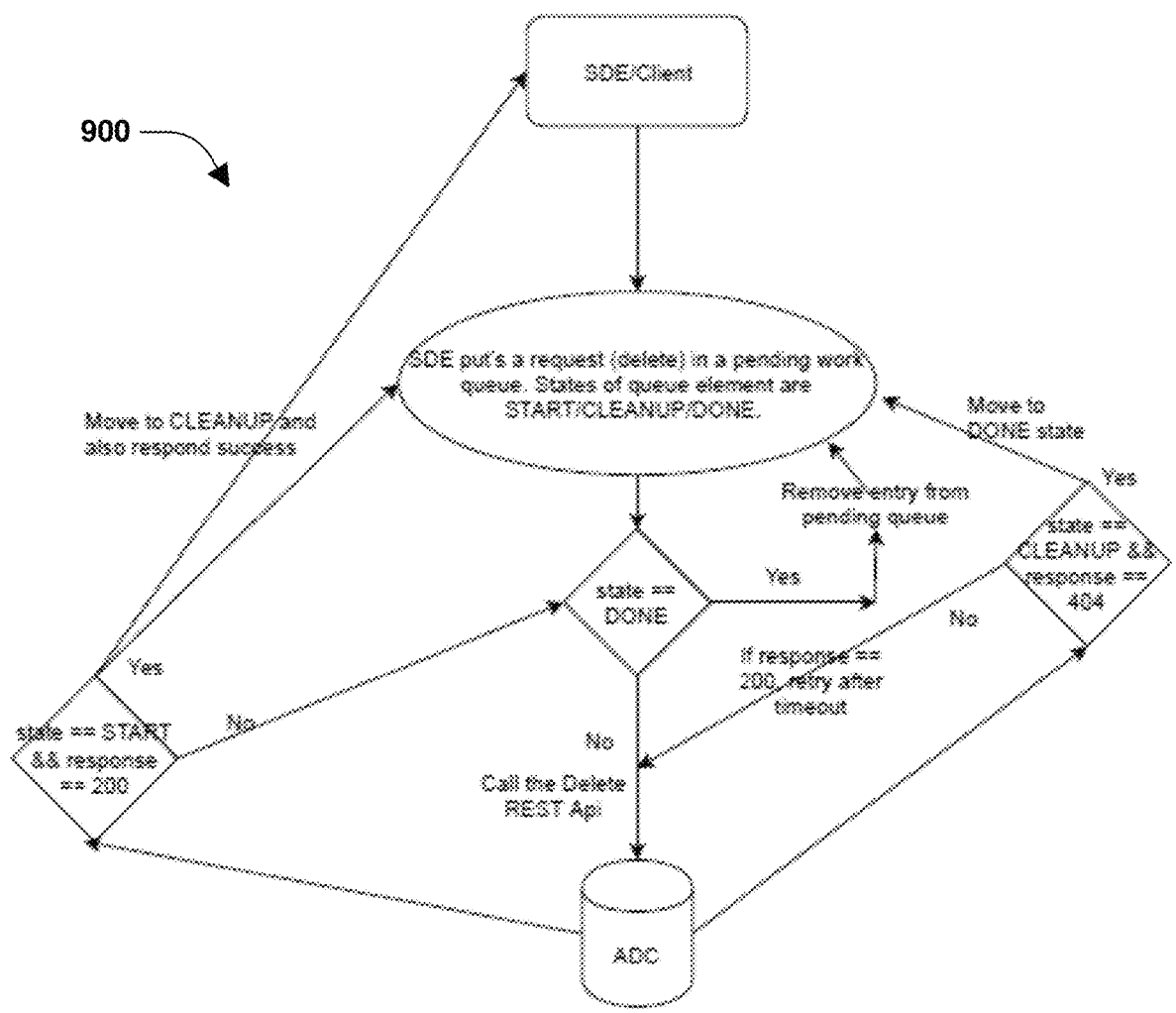
FIG. 9 is a flow chart illustrating an example method for implementing requests associated with objects stored within an object store.

FIG. 9 depicts an example of a request, such as a snapshot request, being implemented by a data connector component (ADC) on behalf of a client (SDE). For example, the client (SDE) may put a request (e.g., a delete request) into a pending work queue that has various states, such as start, cleanup, done. If the state is done, then an entry for the request is removed from the pending queue. If the state is not done, then a delete REST API is called through the data connector component to perform the delete request. The state will then either become a start state or a cleanup state. Once complete, a response of success is provided to the client (SDE).

Figure 10:
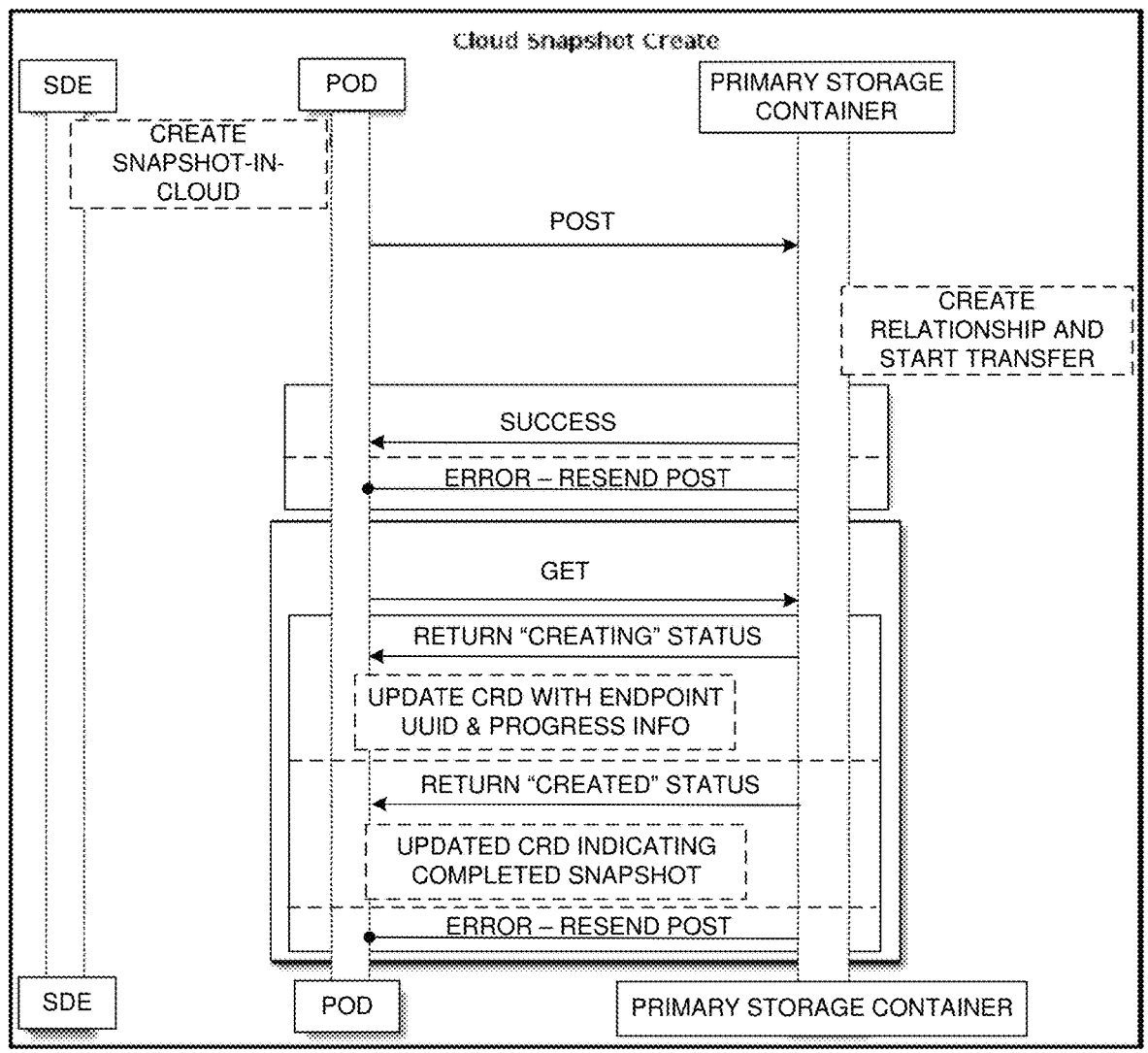
FIG. 10 is a flow chart illustrating an example method for implementing requests associated with objects stored within an object store.
Figure 11:
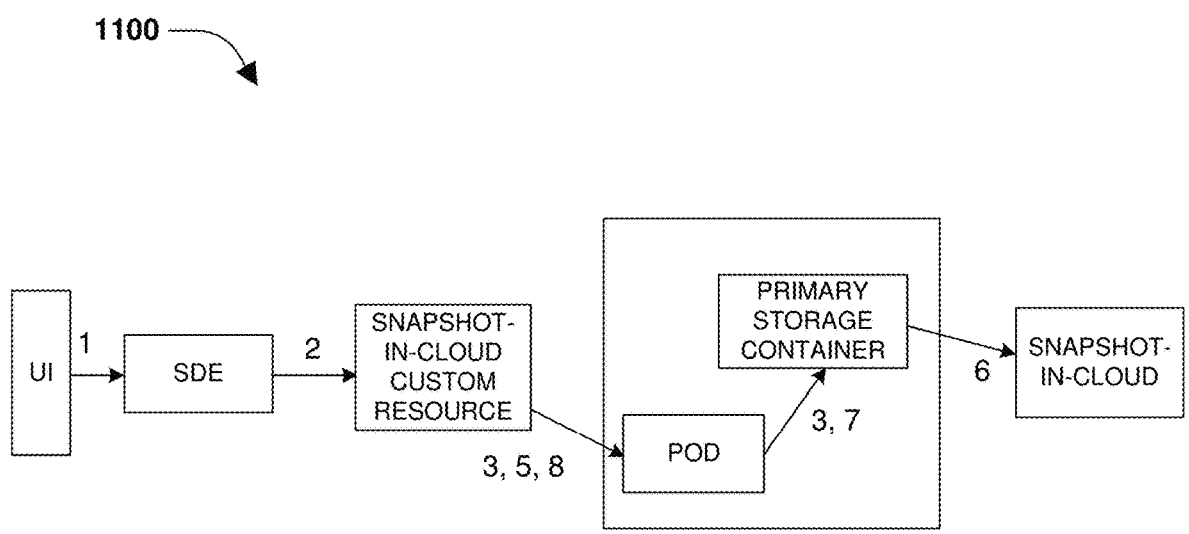
FIG. 11 is a component block diagram illustrating an example system for implementing requests associated with objects stored within an object store.

FIGS. 10 and 11 depicts an example of snapshot creation. In an embodiment, a user selects a volume and request creation of a snapshot-in-cloud. An SDE (e.g., a client) creates a CR for the snapshot-in-cloud (e.g., a custom resource (CR) records the snapshot-in-cloud UUID provided by SDE). Pod (e.g., a component/module implemented by software, hardware, or combination there) picks up the custom resource (CR) for Cloud Snapshot creation and sends a POST to a primary storage container to start the transfer. A POST payload includes the following: cloud bucket info and credentials (bucket info, secret/access) and Snapshot UUID. The primary storage container does the following upon receiving the request: creates a mirroring relationship if not present; creates or recreates object store configuration if not present or information has changed; triggers a 'mirror update' or 'mirror initialize' depending on whether this was the first time snapshot-in-cloud was created or this is a subsequent creation; any failure in the above steps will return an error to POST response. The Pod updates CR with some indication that transfer is 'in progress' so that the Pod will now start sending a GET. A mirror transfer is started and automatically creates a Snapshot on the source volume to replicate to the cloud bucket. UUID for the Snapshot is supplied by SDE, and the Snapshot on the volume will be stamped with this same UUID. Once a snapshot-in-cloud is created for a volume there will be a single Snapshot on the source volume while transfer is idle, and two such Snapshots while the transfer is running. The Snapshot (Volume Snapshot) is stamped with the same UUID. The Pod polls a primary storage container using a GET which returns: Status Creating, created or an error, bytes transferred, transfer progress in % (needs to be stored in CRD), endpoint UUID (needs to be stored in CRD), logical space (needs to be stored in CRD). When transfer completes, the Pod updates the CRD indicating Snapshot-in-cloud is created.

Figure 12:
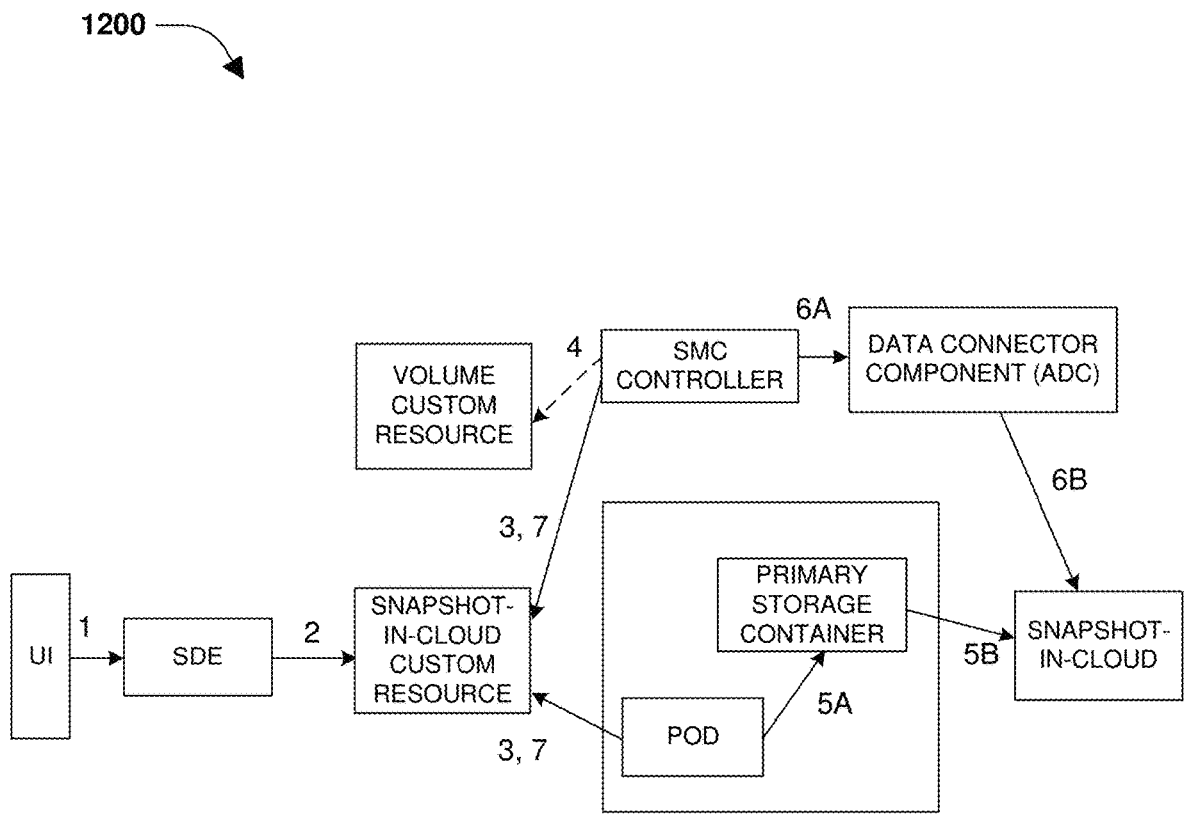
FIG. 12 is a component block diagram illustrating an example system for implementing requests associated with objects stored within an object store.

FIG. 12 depicts an example of snapshot management utilizing a data connector component (ADC), such as deleting a snapshot. In an embodiment, a user selects a Snapshot-in-cloud to delete from the UI. An SDE (via NVC Client) deletes the Snapshot-in-cloud CR. The Pod and SMC Controller detects the Snapshot-in-cloud CR deletion. The SMC Controller checks to see whether the Volume CR is present or not. If the Volume CR is present, this indicates that the Pod is still alive and allows Pod to handle the Snapshot-in-cloud deletion. If the Volume CR is gone, SMC Controller handles the deletion. If the Volume CR is present: Pod repeatedly sends DELETE REST request to primary storage container until complete (i.e., return HTTP Status 404); and primary storage container asynchronously deletes the objects associated with individual Snapshot-in-cloud or the endpoint from the bucket. If the Volume CR not is present: SMC Controller sends DELETE REST request to data connector component (ADC) until complete (i.e., returns HTTP Status 404); and the ADC either marks individual the Snapshot-in-cloud as deleted or asynchronously deletes the endpoint (all objects) from the bucket. Once the Pod or SMC Controller receives a NOT FOUND response from primary storage container/ADC respectively, the finalizer is removed from the Snapshot-in-cloud CR, allowing the CR to be completely removed.

Figure 13:
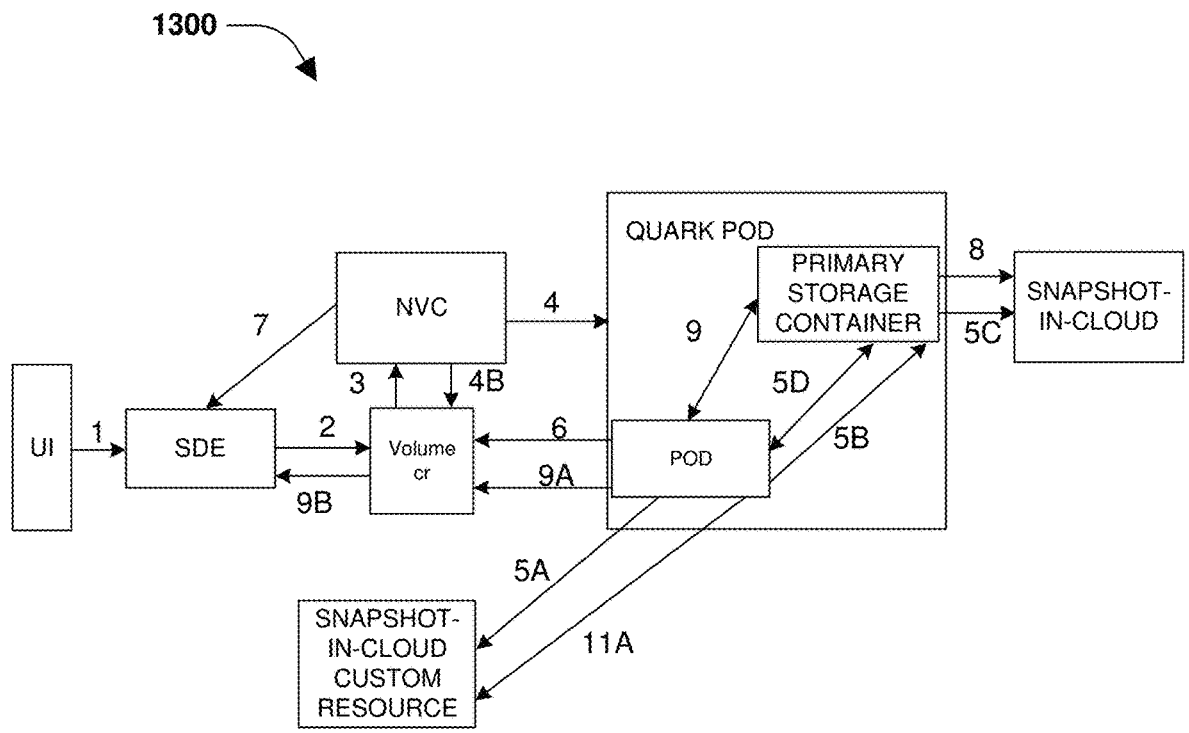
FIG. 13 is a component block diagram illustrating an example system for implementing requests associated with objects stored within an object store.

FIG. 13 depicts an example of snapshot management, such as performing a snapshot restore. In an embodiment, a user selects the cloud snapshot in the front end which they need to restore. THe SDE creates a Volume Custom Resource (CR) to be used for Cloud Snapshot Restore. This CR stores the cloud snapshot UUID. NVC picks up the Volume CR to be used to create the Quark POD. In an example, the space needed for the restored primary storage container is 30% more than the logical space of the cloud snapshot. NVC creates a new Quark POD based on the Volume CR. Based on the Snapshot-in-cloud UUID present in the Volume CR, the primary storage container volume will be created as a DP volume used for OnDemand restore. NVC updates the volume status in the Volume CR after the POD creation is successful. In an example, the volume is not usable by the clients at this point. Volume GET returns 'offline' state at this point. Pod (from the POD created), picks up the endpoint details from the Snapshot-in-cloud CR and issues REST calls to the primary storage container to start Ondemand restore. Pod updates the Snapshot-in-cloud CR incrementing a refcount to prevent deletion of the CR. Pod sends a PATCH request to primary storage container with endpoint and cloud snapshot details (REST API details). Primary storage container issues Ondemand restore to the DP volume from the cloud snapshot. Pod keeps polling the primary storage container for Ondemand restore progress using GET calls. While restore is in the setup phase, a state of 'preparing' will be return. Once this changes to 'restoring', the volume is considered mountable by the client. Pod updates the Ondemand restore progress in the Volume CR. (TBD). Once GET returns 'restoring' state, Pod updates the Volume CR to indicate that volume is ready to be mounted. Pod sets 'restoring' and 'online' state in Volume CR. The primary storage container converts the DP volume to Read-Write. The volume can be used by the clients. The volume remains an Ondemand volume and clients observe lower performance. NVC client creates a VolumeOnline event which is picked up by the SDE and the volume is shown as online in the front end UI. Pprimary storage container starts the phase 2 scanner (data pull) automatically. Pod polls the primary storage container using REST calls to get the phase 2 scanner progress and updates the Volume CR. Once all the data is pulled, primary storage container converts the Ondemand volume to normal volume. The performance limitations no longer apply and the volume performs like any read/write volume. Once the transfer completes Pod gets 'restored' state. Pod decrements the refcount from the Snapshot-in-cloud CR.

Figure 14:
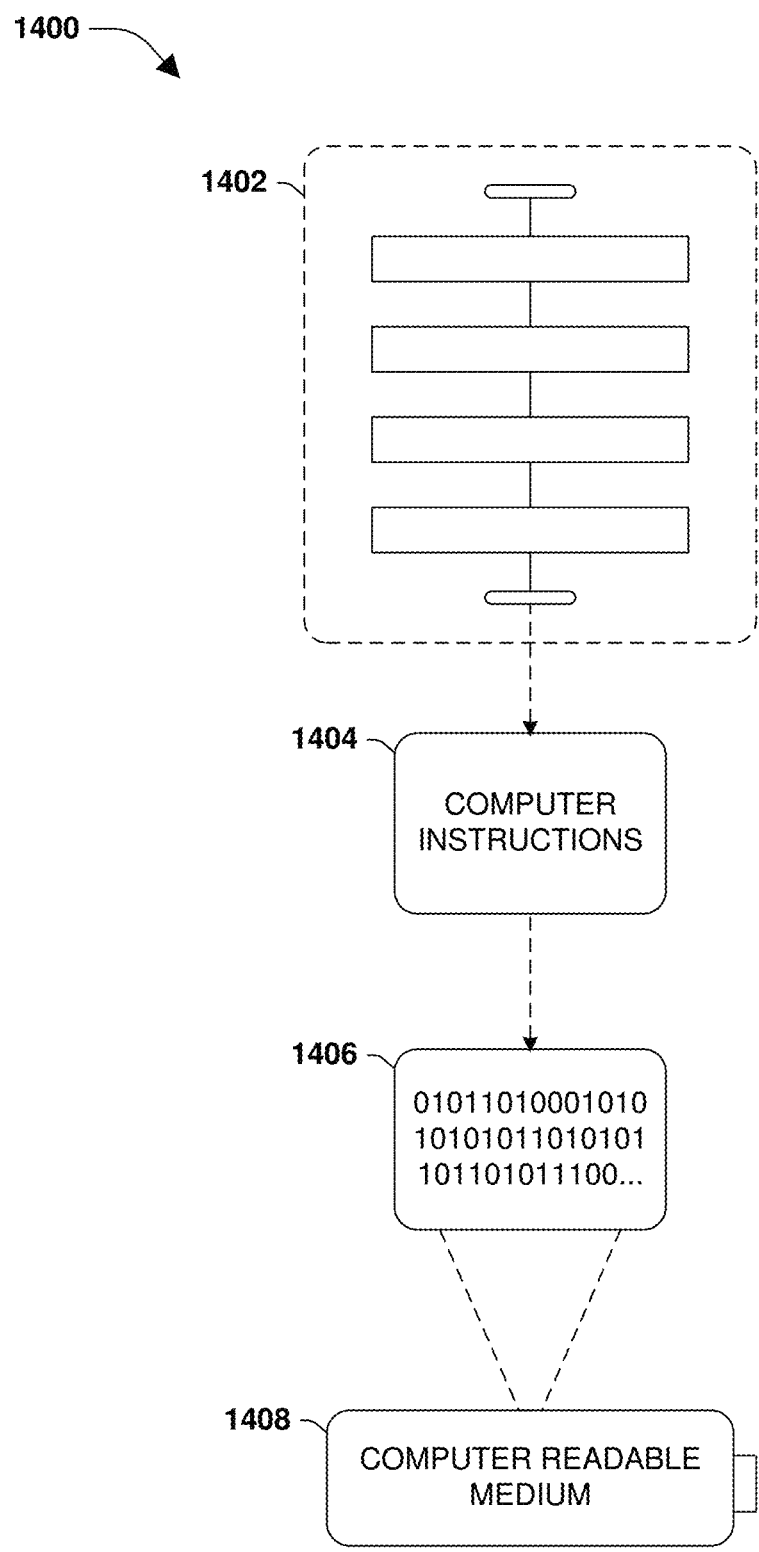
FIG. 14 is a component block diagram illustrating an example computing environment in which an embodiment of the invention may be implemented.

Still another embodiment involves a computer-readable medium 1400 comprising processor-executable instructions configured to implement one or more of the techniques presented herein. An example embodiment of a computer-readable medium or a computer-readable device that is devised in these ways is illustrated in FIG. 14, wherein the implementation comprises a computer-readable medium 1408, such as a compact disc-recordable (CD-R), a digital versatile disc-recordable (DVD-R), flash drive, a platter of a hard disk drive, etc., on which is encoded computer-readable data 1406. This computer-readable data 1406, such as binary data comprising at least one of a zero or a one, in turn comprises processor-executable computer instructions 1404 configured to operate according to one or more of the principles set forth herein. In some embodiments, the processor-executable computer instructions 1404 are configured to perform a method 1402, such as at least some of the exemplary method 600 of FIG. 6, for example. In some embodiments, the processor-executable computer instructions 1404 are configured to implement a system, such as at least some of the exemplary system 700 of FIG. 7, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving a request from a client to view backup data captured by a snapshot stored within objects of an object store hosted by a cloud computing environment;
   traversing, on-demand in response to the request, a snapshot file system of the snapshot to identify files and directories currently being requested by the client, wherein the traversing comprises:
      identifying a root object of the snapshot file system based upon a universal identifier common to object names of a volume captured by the snapshot;
      traversing from the root object to a snapshot info object for the snapshot;
      accessing an inode file identified by a cloud block number within the snapshot info object; and
      evaluating the inode file to identify a file being requested by the client; and
   providing the client with access to the files and directories through a browsable user interface.

2. The method of claim 1, comprising:
   in response to receiving user input through the browsable user interface, navigating the snapshot file system to identify a current set of files and directories being navigated to by the client based upon the user input; and
   updating the browsable user interface to provide the client with access to the current set of files and directories.

3. The method of claim 1, comprising:
   hosting a container for traversing the snapshot file system.

4. The method of claim 1, wherein the traversing comprise:
   traversing a file tree structure of the file until data of the file is identified for populating the browsable user interface.

5. The method of claim 1, wherein a container is deployed on-demand for traversing the snapshot file system, and wherein the method comprises:
   in response to determining that the client is no longer utilizing the browsable user interface, deleting the container.

6. The method of claim 1, wherein a container is deployed on-demand for traversing the snapshot file system, and wherein the method comprises:
   deploying a plurality of containers for traversing snapshot file systems of snapshots accessible to the client through the browsable user interface.

7. The method of claim 1, comprising:
caching object headers of objects and indirects of the snapshot file system encountered during the traversal.

8. The method of claim 1, comprising:
reusing file and metadata that is part of the backup data within the object store.

9. The method of claim 1, wherein a container is deployed on-demand for traversing the snapshot file system, and wherein the method comprises:
maintaining operation of the container for a time duration of the user accessing the browsable user interface.

10. A non-transitory machine readable medium comprising instructions for performing a method, which when executed by a machine, causes the machine to perform operations comprising:
receiving a request from a client to view backup data captured by a snapshot stored within objects of an object store hosted by a cloud computing environment;
traversing, on-demand in response to the request, a snapshot file system of the snapshot to identify files and directories currently being requested by the client, wherein the traversing comprises:
identifying a root object of the snapshot file system based upon a universal identifier common to object names of a volume captured by the snapshot;
traversing from the root object to a snapshot info object for the snapshot;
accessing an inode file identified by a cloud block number within the snapshot info object; and
evaluating the inode file to identify a file being requested by the client; and
providing the client with access to the files and directories through a browsable user interface.

11. The non-transitory machine readable medium of claim 10, wherein the operations comprise:
providing the client with the browsable user interface based upon data and metadata extracted from snapshots stored within objects in the object store according to an object format, wherein the browsable user interface is populated with files and directories within snapshots.

12. The non-transitory machine readable medium of claim 10, wherein the operations comprise:
providing the client with on-demand browsing functionality through the browsable user interface to visually browse and locate files and versions of files within snapshots stored within objects in the object store.

13. The non-transitory machine readable medium of claim 10, wherein the operations comprise:
response to receiving a restore request from the client through the browsable user interface to restore data from the snapshot, utilizing the snapshot file system to identify and restore the data from the object store.

14. The non-transitory machine readable medium of claim 10, wherein the operations comprise:
response to receiving a single file restore request from the client through the browsable user interface to restore a single file from the snapshot, utilizing the snapshot file system to identify and restore the single file from the object store utilizing attributes of the file.

15. A computing device comprising:
a memory storing instructions; and
a processor coupled to the memory, the processor configured to execute the instructions to cause the processor to perform operations comprising:
receiving a request from a client to view backup data captured by a snapshot stored within objects of an object store hosted by a cloud computing environment;
traversing, on-demand in response to the request, a snapshot file system of the snapshot to identify files and directories currently being requested by the client, wherein the traversing comprises:
identifying a root object of the snapshot file system based upon a universal identifier common to object names of a volume captured by the snapshot;
traversing from the root object to a snapshot info object for the snapshot;
accessing an inode file identified by a cloud block number within the snapshot info object; and
evaluating the inode file to identify a file being requested by the client; and
providing the client with access to the files and directories through a browsable user interface.

16. The computing device of claim 15, wherein the operations comprise:
exposing, through the browsable user interface, a namespace to the client at a storage structure granularity.

17. The computing device of claim 15, wherein the operations comprise:
utilizing a namspace, exposed through the browsable user interface the client, to provide the client with the ability to browse files, directories, and read file data for snapshots stored in the object store at one or more granularities.

18. The computing device of claim 15, wherein the operations comprise:
in response to receiving user input through the browsable user interface, navigating the snapshot file system to identify a current set of files and directories being navigated to by the client based upon the user input; and
updating the browsable user interface to provide the client with access to the current set of files and directories.

19. The computing device of claim 15, wherein the operations comprise:
hosting a container for traversing the snapshot file system.

20. The computing device of claim 15, wherein the operations comprise:
traversing a file tree structure of the file until data of the file is identified for populating the browsable user interface.

* * * * *